United States Patent [19]
Yoshida et al.

[11] Patent Number: 5,744,874
[45] Date of Patent: Apr. 28, 1998

[54] CAR ELECTRONIC CONTROL SYSTEM & METHOD FOR CONTROLLING THE SAME

[75] Inventors: Tatsuya Yoshida, Ibaraki-ken; Mitsuru Kon'i, Hitachinaka, both of Japan

[73] Assignees: Hitachi, Ltd.; Hitachi Car Engineering Co., Ltd., both of Japan

[21] Appl. No.: 651,559

[22] Filed: May 22, 1996

[30] Foreign Application Priority Data

May 24, 1995 [JP] Japan ................................. 7-124707

[51] Int. Cl.⁶ ............................................ H04Q 7/00
[52] U.S. Cl. ................... 307/10.1; 307/9.1; 340/825.69; 340/825.31; 364/424.045; 395/750
[58] Field of Search ............................. 307/9.1–10.8; 180/287; 340/425.5, 426, 428, 438, 825.31, 825.69, 825.72, 539; 364/423.098, 423.099, 424.037, 424.045, 424.059; 395/750

[56] References Cited

U.S. PATENT DOCUMENTS

| | | | |
|---|---|---|---|
| 5,115,236 | 5/1992 | Kohler | 340/825.69 |
| 5,153,558 | 10/1992 | Robinson | 340/428 |
| 5,166,661 | 11/1992 | Chen | 340/425.5 |
| 5,196,728 | 3/1993 | Jaux | 307/10.1 |
| 5,239,520 | 8/1993 | Arnold | 307/10.1 |
| 5,252,966 | 10/1993 | Lambropoulos | 340/825.69 |
| 5,305,459 | 4/1994 | Rydel | 395/750 |
| 5,396,217 | 3/1995 | Proefke | 340/426 |
| 5,406,274 | 4/1995 | Lambropoulos | 340/825.69 |
| 5,442,341 | 8/1995 | Lambropoulos | 340/825.31 |
| 5,481,253 | 1/1996 | Phelan | 340/825.31 |
| 5,483,517 | 1/1996 | Kurata | 307/10.1 |
| 5,515,036 | 5/1996 | Waraksa | 340/825.72 |
| 5,552,641 | 9/1996 | Fischer | 307/10.5 |
| 5,586,130 | 12/1996 | Doyle | 340/438 |

*Primary Examiner*—Richard T. Elms
*Assistant Examiner*—Peter Ganjian
*Attorney, Agent, or Firm*—Evenson, McKeown, Edwards & Lenahan, P.L.L.C.

[57] ABSTRACT

A car remote control system utilizing a signal in the form of electromagnetic wave or infrared ray called 'keyless entry'. When receiving a predetermined wake-up signal, an MPU is once operated even when the received input signal is a noise signal to perform only judging operation of whether or not the input signal is normal. Only when judging that the input signal is a normal wake-up signal, the MPU controllably causes an electronic circuit to be shifted to a usual operation mode. When judging that the input signal is the noise signal prior to full input of the tuner signal, the MPU immediately shifts to a sleep mode. Thereby current consumption of an electronic control circuit can be suppressed.

3 Claims, 26 Drawing Sheets

FIG. 14A
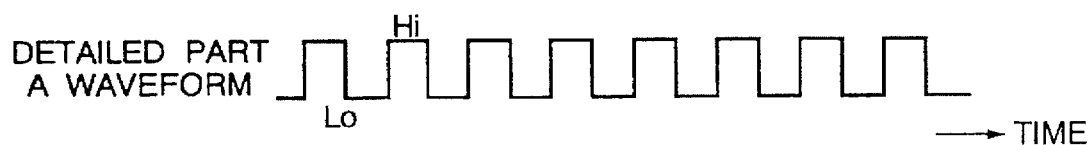
FIG. 14B
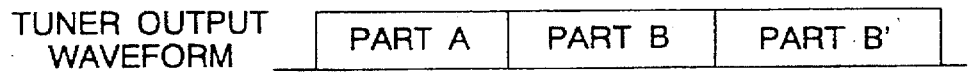
FIG. 14C
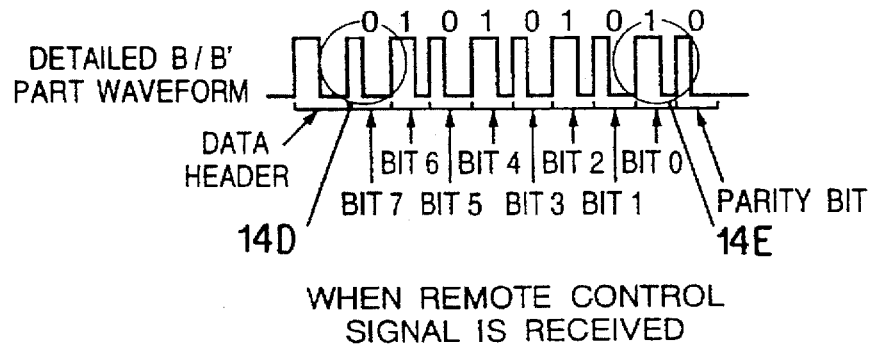
WHEN REMOTE CONTROL
SIGNAL IS RECEIVED
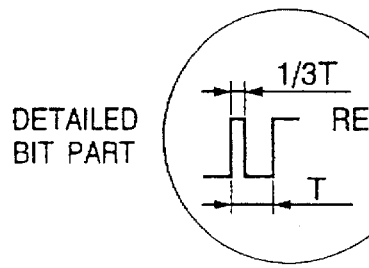
FIG. 14D
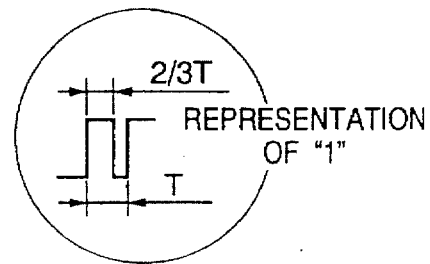
FIG. 14E

IN THE
ABSENCE
OF NOISE

IN THE
PRESENCE
OF NOISE

WHEN REMOTE COTROL SIGNAL
IS NOT RECEIVED

⟶ TIME

DETAILED PART
A WAVEFORM
(PREAMBLE PART)

WITHOUT NOISE

DETAILED PART
A WAVEFORM
(PREAMBLE PART)

WITH NOISE

DETAILED PART
B / B' WAVEFORM
(DATA PART)

WITHOUT NOISE

DETAILED PART
B / B' WAVEFORM
(DATA PART)

WITH NOISE

→ TIME

PRESENT INVENTION 5,744,874

CAR ELECTRONIC CONTROL SYSTEM & METHOD FOR CONTROLLING THE SAME

BACKGROUND OF THE INVENTION

The present invention relates to an electronic control system for performing remote control over a car or vehicle with use of a radio signal such as radio wave or infrared ray, called keyless entry and more particularly, to an electronic control system for car remote control which switches between its sleep and operational modes as well as to a multiplex communication system employed for the electronic control system.

As a system for controlling supply of power to this type of electronic control system not having a remote control function, it is known as disclosed in JP-A-63-71451 to stop a terminal clock when power supply is unnecessary.

Also disclosed in JP-A-5-32142 is a system, when a microcomputer-controlled system is put in its sleep mode, for also causing a power supply for a watch dog timer to be automatically turned OFF, thus realizing reduction in its current consumption. Further, when it is desired to provide a remote control function to the electronic controller, such a power control system as to follow is considered.

An exemplary schematic arrangement of the power control system is shown in FIG. 1 wherein reference numeral 50' denotes an electronic controller. An antenna 54' receives a radio wave signal issued from a transmitter T carried by a car driver and sends the radio wave signal to a tuner 55'. The tuner 55' in turn, when receiving the radio wave signal from the antenna 54', modulates the radio wave signal into a digital signal and sends the digital signal to a microprocessor unit (MPU) 56'. The MPU 56' judges the signal received from the tuner 55' to control a trunk lid opener motor 60' or the like. Numeral 58' denotes a low-frequency oscillation circuit and numeral 59' denotes a high-frequency oscillation circuit. The MPU operates with a high frequency clock received from the high-frequency oscillation circuit 59' for the purpose of performing high-speed calculating operation in a usual operational mode; whereas, the MPU operates with a low frequency clock received from the low-frequency oscillation circuit 58' for the purpose of suppressing current consumption in a sleep mode. Control signals 62' and 63' act to stop the low- and high-frequency oscillation circuits 58' and 59' respectively. In the illustrated example, even in the sleep mode, the MPU operates at a low speed to monitor the signal received from the tuner.

Such another system as shown in FIG. 2 is also considered. That is, the system is arranged so that the output signal of the tuner 55' is processed by a signal processing circuit 65 not by the MPU 56' to be applied to the MPU as a wake-up signal and a control signal for the MPU.

With the above prior art control unit for receiving the radio wave signal and controlling power supply based on the received signal, various types of electromagnetic waves are present in the air so that, even when the tuner fails to receive the normal radio wave signal, the tuner can issue an output signal. To avoid this, power supply to the tuner is intermittently carried out from an intermittent power supply 53' shown in FIG. 1 or 2 to reduce a current to be consumed by the tuner. Further, for preventing noise from waking up the control unit, the unit judges whether or not the output signal of the tuner is normal on the basis of only first part of the entire tuner output signal within a time duration shorter than an intermittent time duration. When the control unit judges that the tuner output signal is normal, the control unit shifts the clock of the MPU to a higher frequency clock for usual operation and also causes the intermittent power supply circuit to supply power continuously in the example of FIG. 1. In the example of FIG. 2, when a processing circuit 65 judges that the tuner signal is normal, the MPU starts its operation to perform the usual operation, and also causes the intermittent power supply 53' to supply power continuously. Since the tuner signal having such a waveform as shown in FIG. 3 is judged as not normal, the MPU will not perform the usual operation. When the tuner signal is such a pulse signal having a relatively wide pulse width as shown in FIG. 4 and first one (A) of pulses in the pulse signal is normally input, on the other hand, the MPU performs the usual operation and causes the intermittent power supply 53' to continuously supply power to the tuner, thus reducing current consumption. In either example, in order to judge whether or not the tuner signal is normal, the oscillation circuits of the MPU are required in the example of FIG. 1 while the oscillation circuit of the processing circuit is required in the example of FIG. 2. In addition, even when the pulses in the tuner signal are followed by a noise pulse signal having a relatively small pulse width as in FIG. 4, that is, even when it is later judged as unnecessary to start or wake up the MPU, the MPU is already put in the usual control operation after the once normal judgement. For this reason, the MPU can be put in the sleep mode only after a re-sleeping procedure is carried out. In this way, in the prior art, the low-frequency oscillation circuit is operated even in the sleep mode so that, even when it is unnecessary to wake up the system, the entire system is put in the usual operation, thus disabling realization of sufficiently reduced current consumption.

SUMMARY OF THE INVENTION

It is an object of the present invention to provide an electronic control system and method which can sufficiently suppress current consumption even in a high-noise application environment, and also to provide a multiplex communication system using the electronic control system or method.

In order to attain the above object, when a wake-up signal is input, an MPU is first operated even when the wake-up signal is a noise signal to merely judge whether or not the input signal is normal, and only after the MPU reliably judges that the input signal is a normal signal, the MPU is shifted to its usual operation. Further, when judging that the input signal is the noise signal prior to input of the full tuner signal, the MPU immediately shifts to a sleep mode.

With such an arrangement as mentioned above, since the need for provision of an oscillation circuit to a circuit for judgment of whether to be a wake-up signal can be eliminated, current consumption in the sleep mode can be suppressed. Further, even after the MPU starts its operation, the MPU is not shifted to a usual control operation until the MPU judges that the wake-up signal is normal. Thus, as soon as the MPU judges that the input signal is the noise signal, the MPU can be immediately shifted to the sleep mode, whereby the time duration of operation of the MPU can be minimized and current consumption can be suppressed even in a high noise state.

BRIEF DESCRIPTION OF THE DRAWINGS

FIGS. 14A, 14B and 14C show waveforms of parts of a signal for explaining the operation of the electronic control system when receiving a remote control signal;

FIGS. 14D and 14E are isolated views of the zero and one parts of the wave form in FIG. 14C.

FIG. 15 shows waveforms of the output of the tuner when the electronic control system receives no remote control signal, wherein

FIG. 16 shows waveforms of preamble and data parts A, B and B' in the tuner output waveform, wherein

DESCRIPTION OF THE PREFERRED EMBODIMENTS

Figure 1:
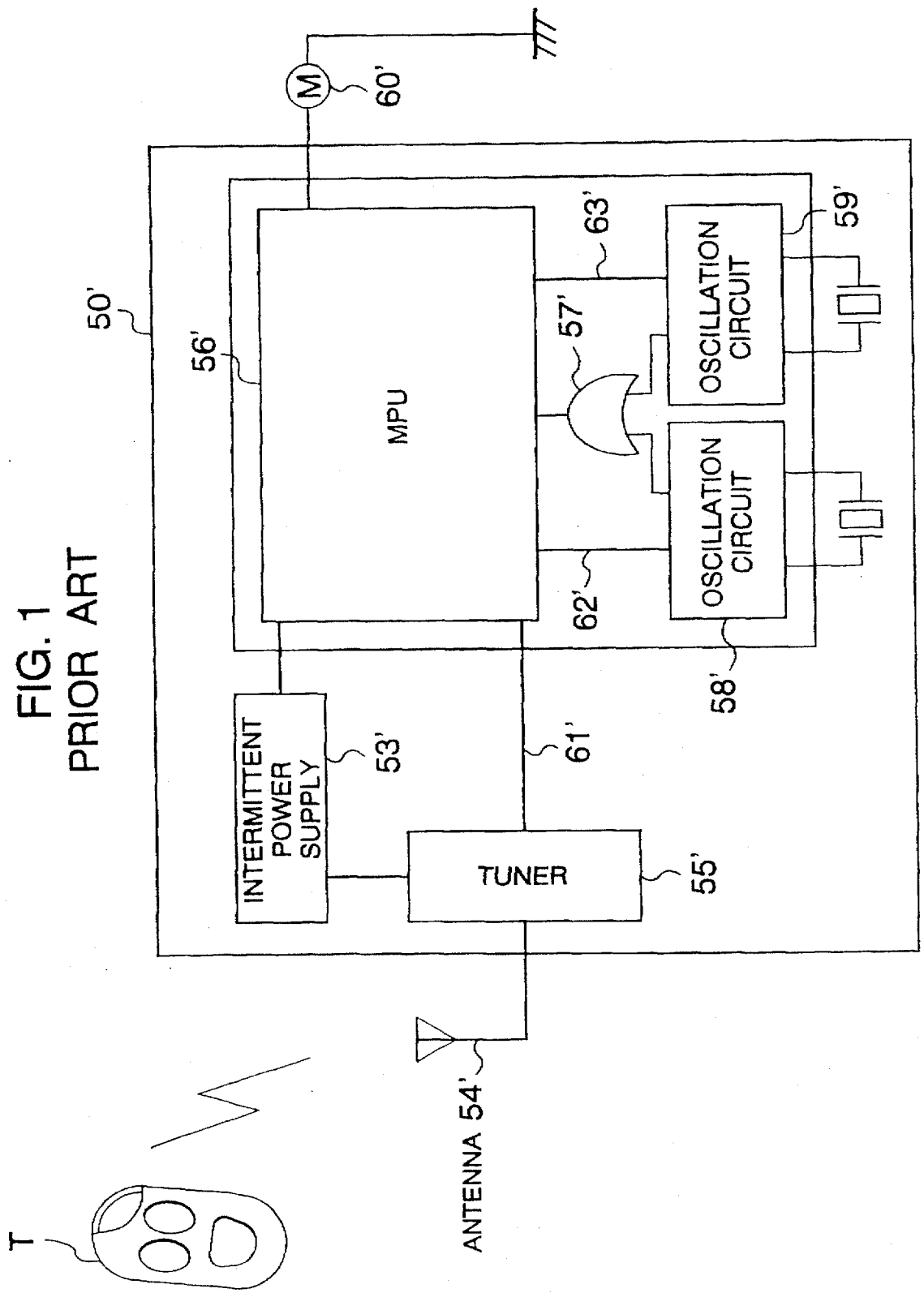
FIG. 1 is a block diagram of an arrangement of a prior art electronic control system as a first example.
Figure 2:
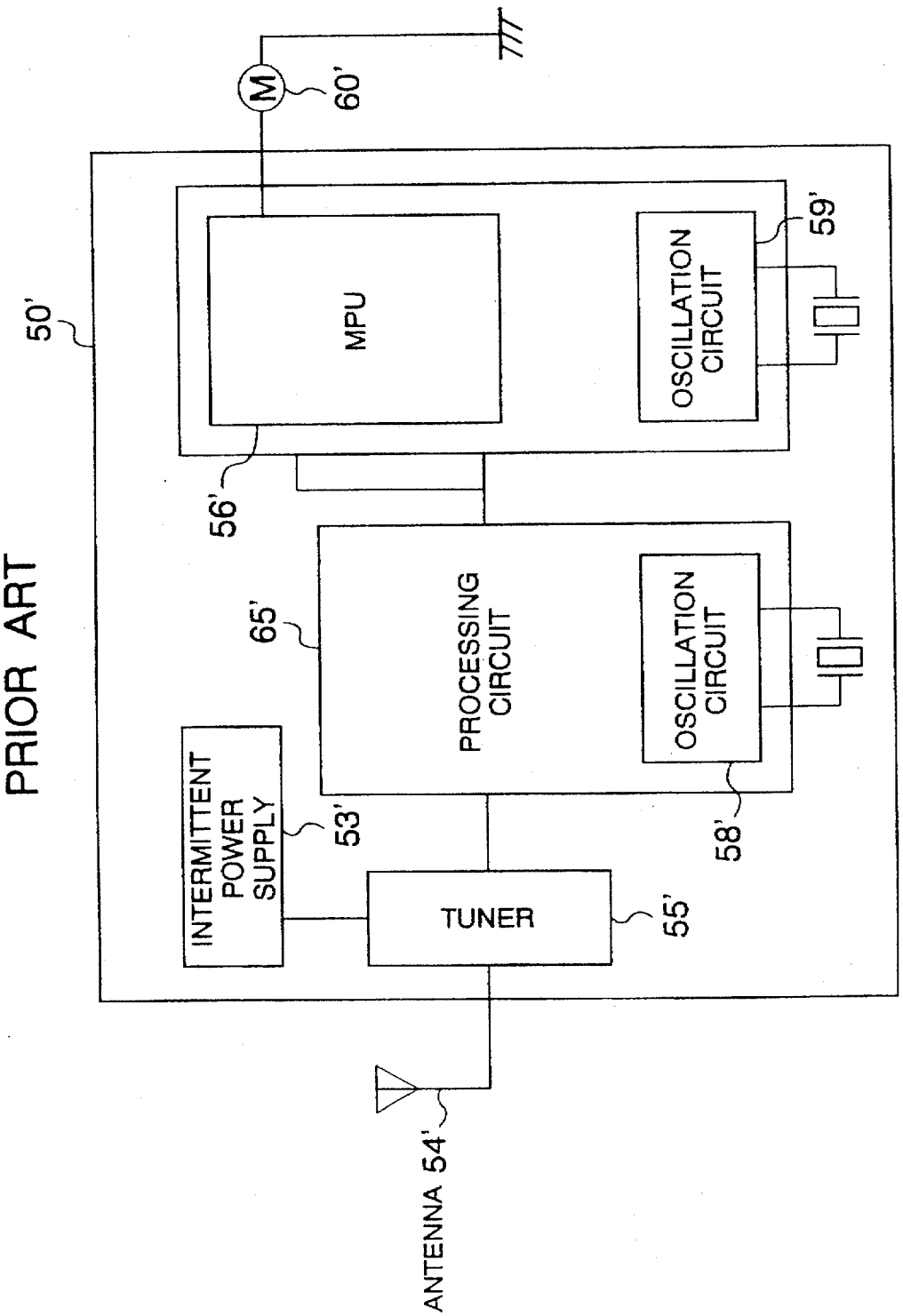
FIG. 2 is a block diagram of an arrangement of a prior art electronic control system as a second example.
Figure 3:
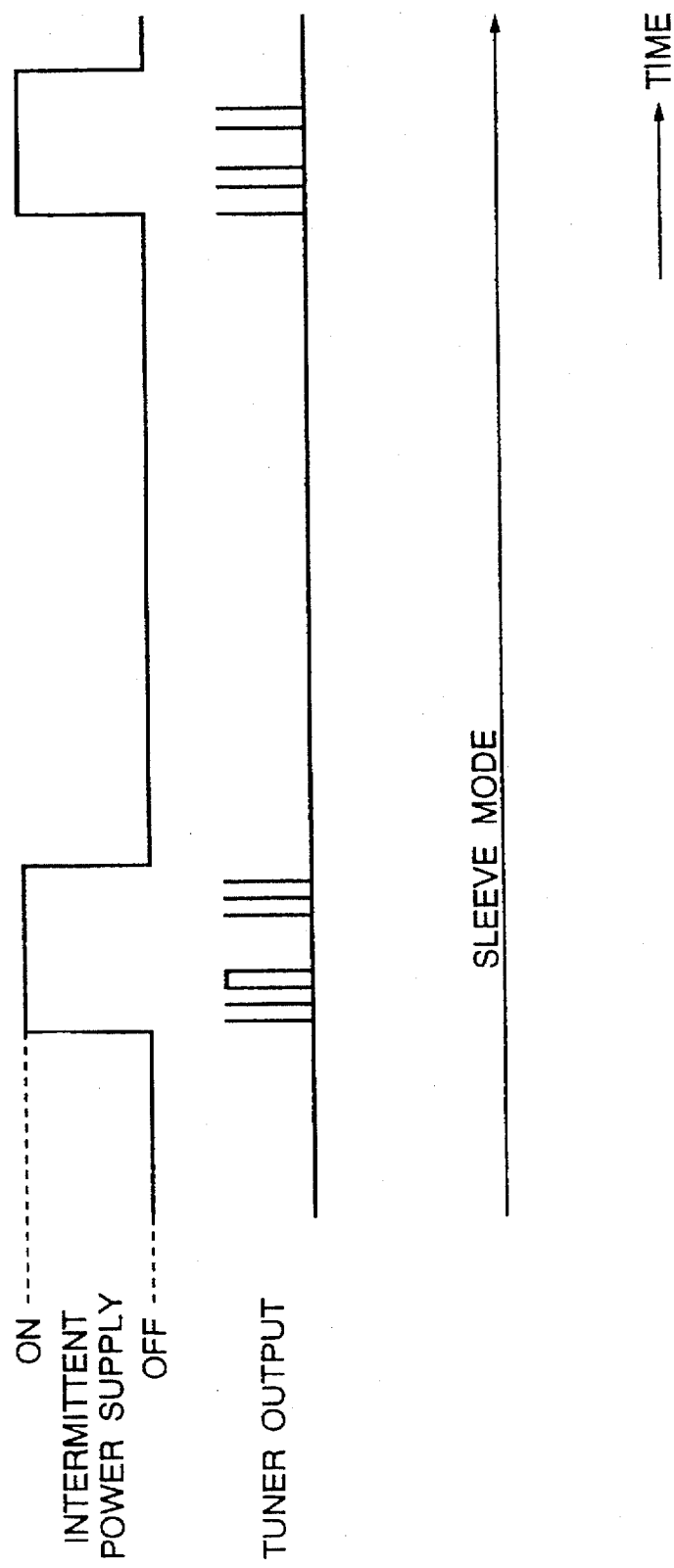
FIG. 3 shows waveforms of signals appearing in the prior art example of FIG. 1 for explaining how to detect an output of a tuner therein.
Figure 4:
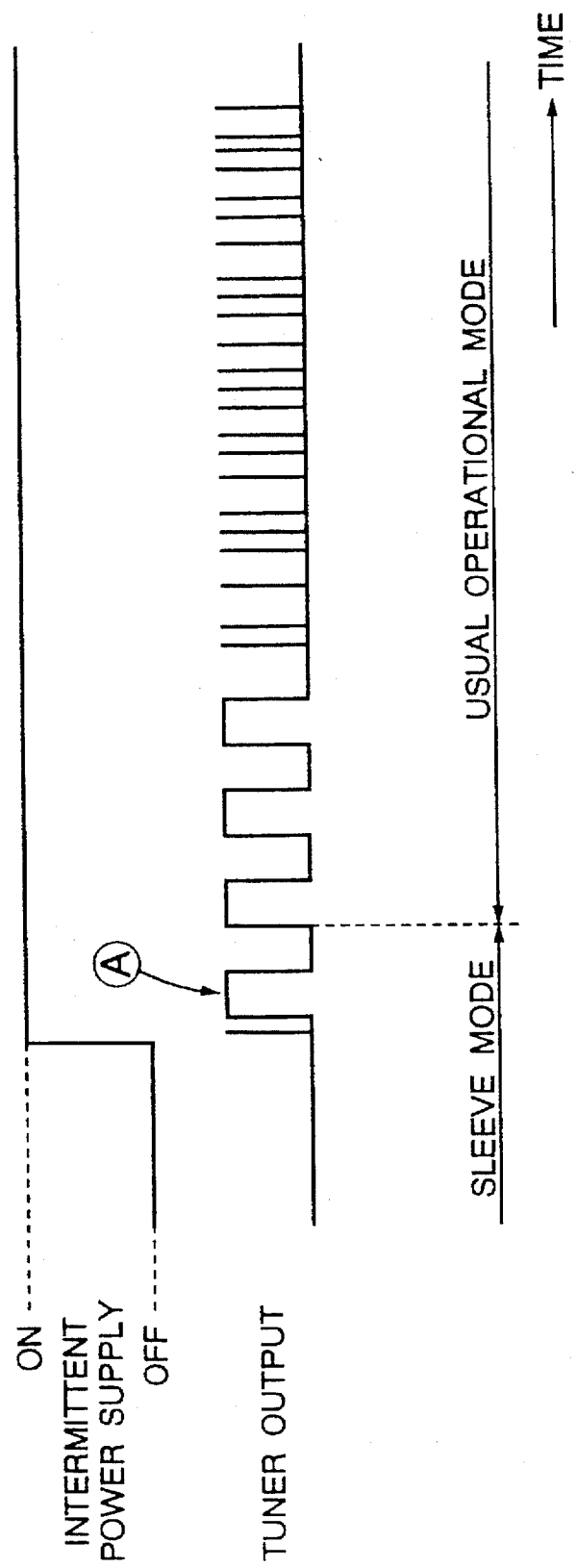
FIG. 4 shows waveforms of signals appearing in the prior art example of FIG. 2 for explaining how to detect an output of a tuner therein.
Figure 5:
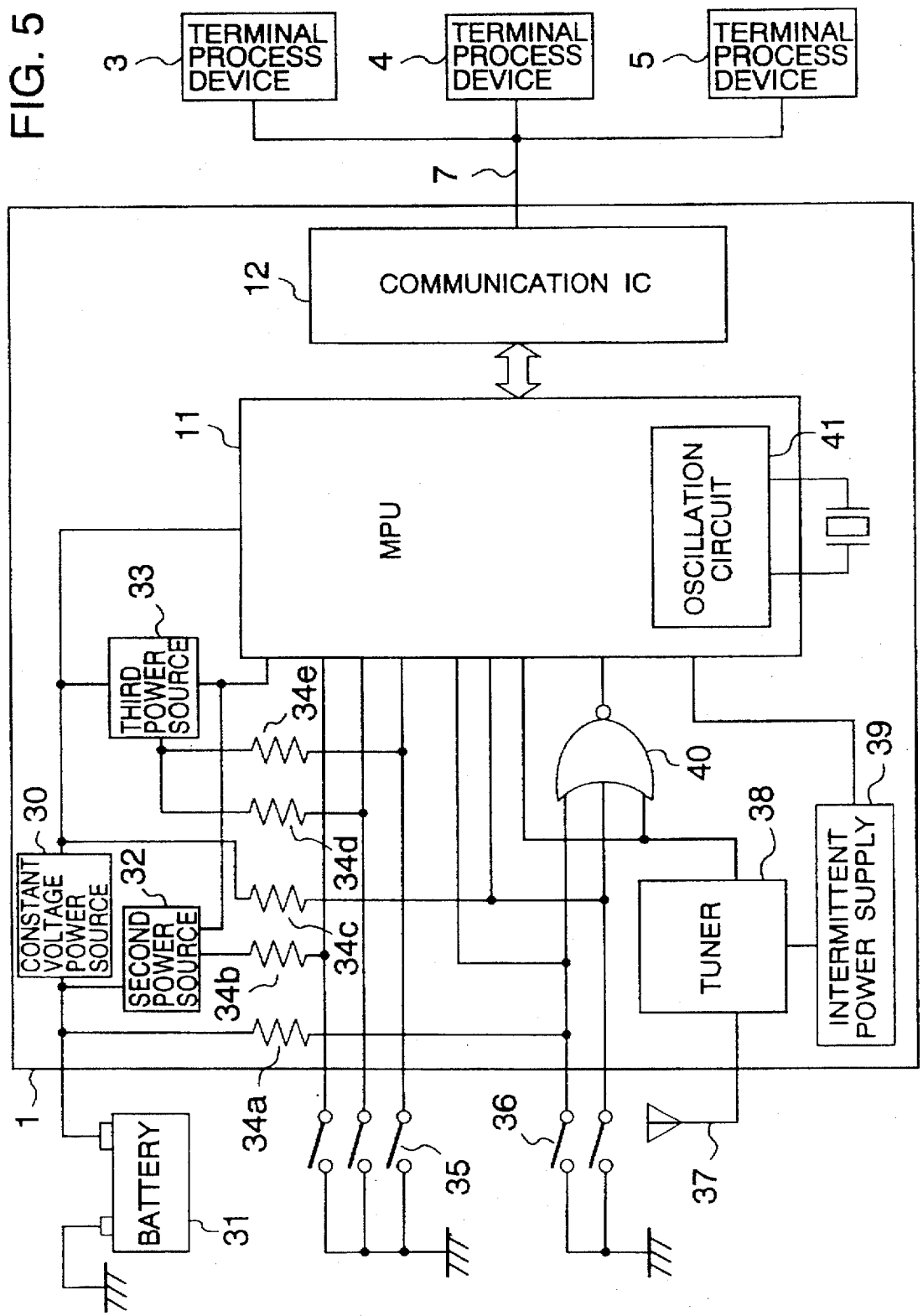
FIG. 5 is a block diagram of a central processing unit shown in FIG. 6 showing a first embodiment of the present invention.
Figure 6:
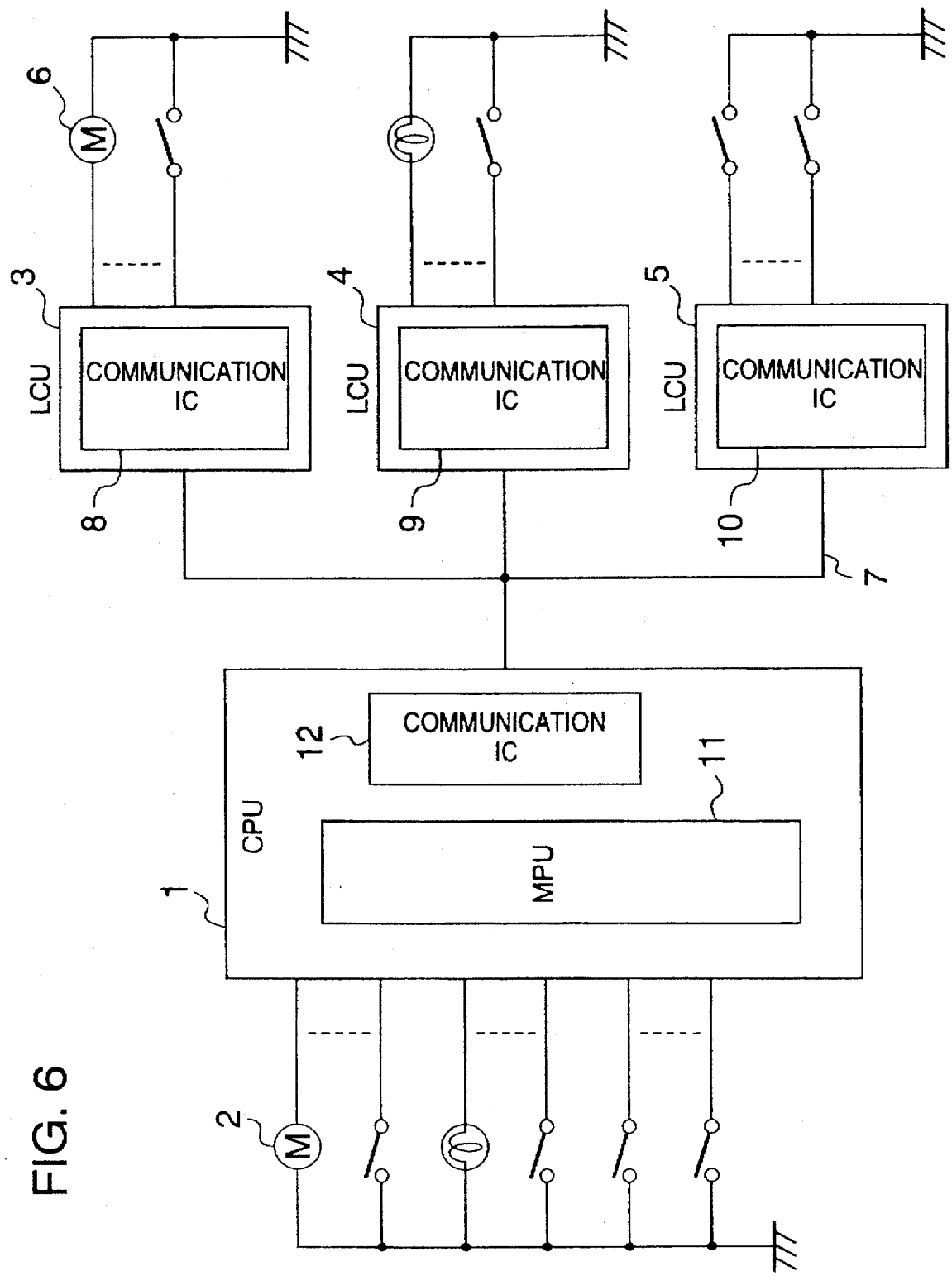
FIG. 6 is a block diagram of an arrangement of an electronic control system in accordance with the first embodiment of the present invention.

There is shown a block diagram of an arrangement of an electronic control system in accordance with a first embodiment of the present invention in FIGS. 5 and 6, wherein FIG. 5 is a block diagram of details of a central processing unit (CPU) 1 in FIG. 6. In FIGS. 5 and 6, terminal processors 3, 4 and 5 are connected to each other by a multiplex communication line 7 so that input information on switches connected to the respective terminal processors or output information on lamps or motors connected thereto are transferred on a multiplex communication basis to carry out entire control thereover. In FIG. 5 showing the configuration of the central processing unit 1, a battery 31 supplies power to the central processing unit and also to respective devices of the entire vehicle including the terminal processors 3, 4 and 5. A second power supply circuit 32 switches between supply or non-supply of a voltage of the battery to circuits positioned downstream thereof on the basis of a signal received from a microprocessor unit (MPU) 11, and a third power supply circuit 33 switches between supply or non-supply of an output of a constant-voltage power supply circuit 30 to circuits positioned downstream thereof on the basis of a signal received from the MPU 11. A switch unit 35 is made up of a plurality of switches connected to the central processing unit to supply power from the second or third power supply circuit to the MPU through pull-up resistors 34a, 34b, 34c, 34d and 34e. Similarly, a wake-up switch unit 36 is made up of a plurality of switches connected to the central processing unit to supply power from the battery or constant-voltage power supply circuit to the MPU through the pull-up resistors 34a and 34c. More specifically, switch signals of these switch units are connected to input ports of the MPU to be read therein for control. The car is equipped with a keyless entry radio system for remote control of the car, which has a portable transmitter for emitting signals in the form of electromagnetic wave or infrared ray such as a start signal of an engine, an open/close signal of a trunk, or an open/close signal of a power window, and which also has a receiver mounted on the car for receiving the signal emitted from the transmitter. An antenna 37, which is attached to the receiver of the above radio system, receives the aforementioned signal from the transmitter of the radio system and applies it to a tuner 38 where the input signal is demodulated an then sent to the MPU 11. A power supply circuit 39 for power supply to the tuner supplies power continuously or intermittently to the tuner on the basis of a control signal received from the MPU 11. An output signal of the switch unit 36 and an output signal of the tuner 38 are applied to a logical gate 40 which output is connected to the MPU 11 as a wake-up signal. Although not illustrated in the drawing, these input signals are previously subjected by a hardware filter circuit to removal of high frequency components. An oscillation circuit 41 oscillates in an operational mode of the car while stops its oscillating operation in a sleep mode to reduce current consumption. A communication IC 12 performs multiplex communication with another terminal processor through the multiplex communication line 7. This communication IC may be built in if necessary.

Figure 7:
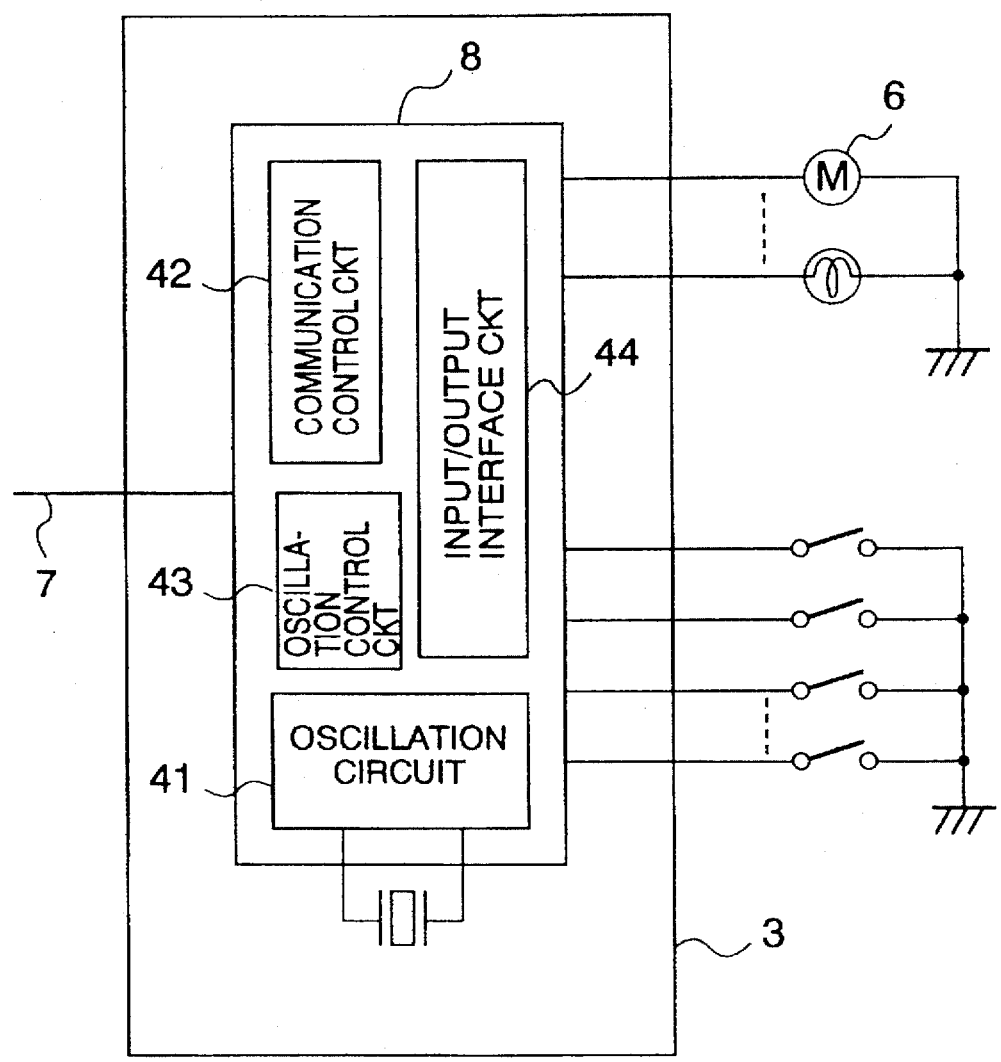
FIG. 7 is a block diagram of a terminal processor in the embodiment of FIG. 6.

Shown in FIG. 7 is a structure of the terminal processor 3. The terminal processors 4 and 5 have substantially the same structure as the terminal processor 3. In the drawing, a communication IC 8 performs multiplex communication with the central processing unit (CPU) 1 through the multiplex communication line 7 to send input data from a device connected to the terminal processor to the central processing unit 1 and to send data received from the central processing unit 1 to an actuator 6 or the like connected to the terminal processor. A communication control circuit 42 controls the sending and receiving operation of the communication IC 8. An oscillation control circuit 43 detects a sleep/wake-up signal from the central processing unit and on the basis of the detected signal, controls the oscillating operation of the oscillation circuit 41 or stoppage thereof. Reference numeral 44 denotes an input/output interface circuit. The terminal processors 4 and 5 have substantially the same structure as the terminal processor 3, except that their input/output circuits are connected with switches and actuators different from those of the terminal processor 3.

The MPU 11 of the central processing unit 1 receives input signals from the switch units 35 and 36 and input signals from other sensors and terminal processors, calculates control data on motors, lamps, etc. connected to the central processing unit and on actuators of the other terminal processors, and outputs the calculated data thereto to perform entire control over the system. With such an in-car system, when the engine is stopped and no person rides in the car, the MPU stops oscillation of a clock within the MPU, turns OFF the second and third power supply circuits 32 and 33, or stops oscillation of a clock within the terminal processor, for the purpose of suppressing the power consumption of the battery. The switches of the switch unit 36 include a door switch, a key insertion switch and an ignition switch. Since these switches are used to shift the sleep mode to the operational mode, it is necessary to detect the states of the switches even when the system is in the sleep mode. To this end, the switches are pulled up to the battery voltage or the voltage of the constant-voltage power supply circuit 30. The switches of the switch unit 35 include, for example, a wiper switch and a rear defogger switch which states will not change in the sleep mode. As for the rear defogger switch for example, this switch is operated only when the ignition switch is in its ON state, so that the ON state of the rear defogger switch means that the ignition switch is already turned ON before the defogger switch is turned ON and thus the system is in the operational mode. Thus, since it is unnecessary in the sleep mode to detect the states of the switches, the power to be supplied to the switches are set at the power of the second or third power supply circuit 32 or 33 which is turned OFF in the sleep mode. The tuner power supply circuit 39 is required to operate even in the sleep mode, but the continuous operation of the tuner power supply circuit at all times involves great current consumption. To avoid this, the tuner power supply circuit 39 is of an intermittent power supply type which supplies power intermittently in the sleep mode. The intermittent power supply circuit continuously supplies power during the operation of the MPU. The signals of the wake-up switch unit 36 and the output signal (tuner signal) of the tuner 38 for shifting the sleep mode to the operational mode are applied to the MPU and concurrently also to the logical gate 40. The logical gate 40 is connected at its output to a wake-up request terminal of the MPU to output a wake-up signal thereto so that, when receiving the wake-up signal, the MPU initiates the oscillation circuit 41 to start the wake-up operation.

Figure 11:
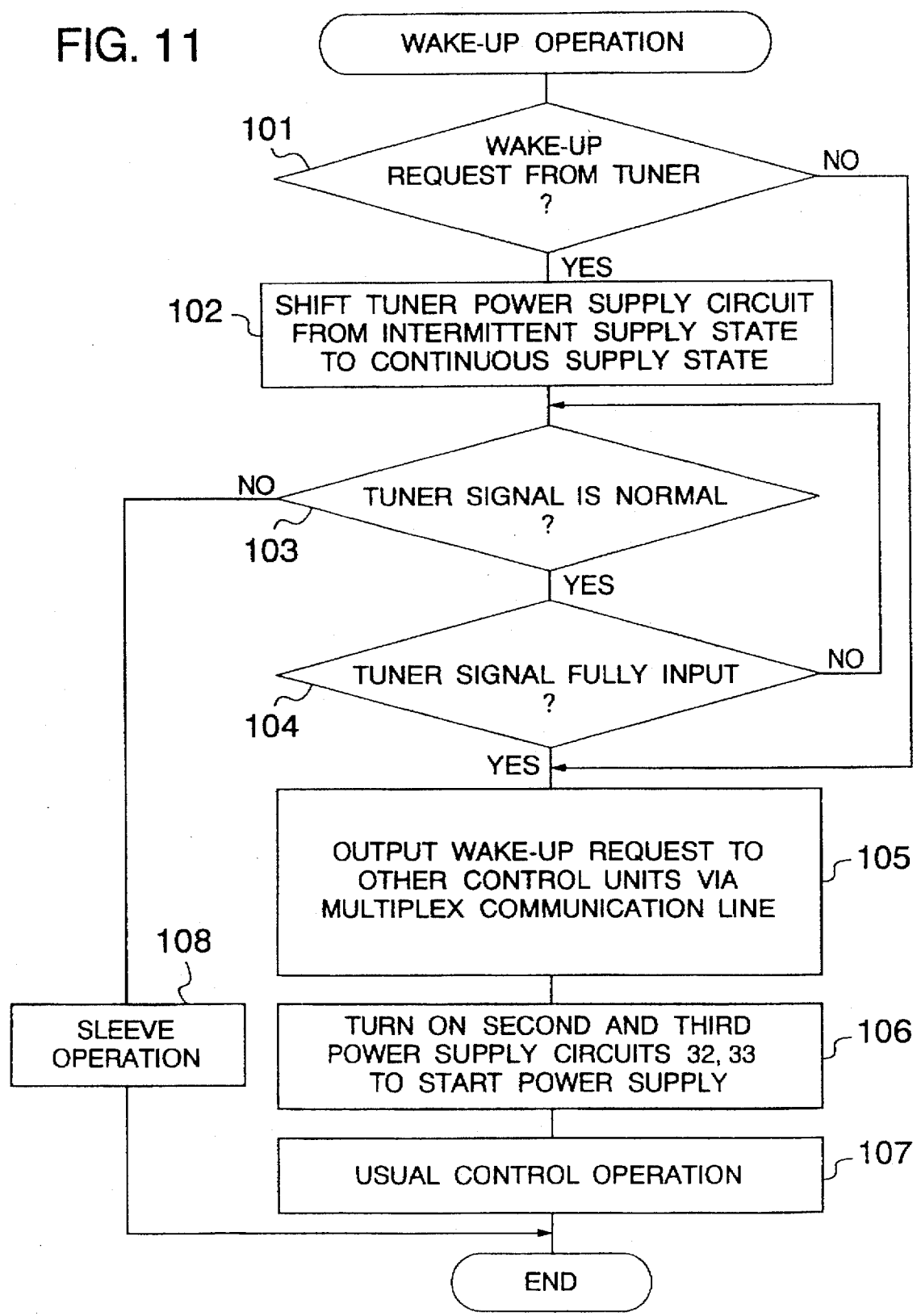
FIG. 11 shows waveforms of the signals appearing in the embodiment of FIG. 6 for explaining how to detect the output of the tuner therein.

Explanation will next be made as to the operation of the present embodiment by referring to a flow-chart of FIG. 11. When the entire system is in the sleep mode, an input of a signal to the wake-up request terminal causes the MPU to start the wake-up operation of FIG. 11. More in detail, the system first judges at a step 101 whether or not the input signal to the wake-up request terminal is the wake-up signal from the tuner on the basis of signals other than the tuner signal applied to the terminals other than the wake-up request terminal. When determining the wake-up request from the non-tuner, the system transmits, at a step 105, the wake-up request to the other control units (terminal processors 3, 4 and 5 in the present embodiment) through the multiplex communication line 7. The terminal processors 3, 4 and 5, when receiving the wake-up signal, start their oscillating operation to start their main operation. At a next step 106, the system turns ON the second and third power supply circuits 32 and 33 to start power supply to the entire circuits. After this operation, the system starts usual control operation at a step 107. In this way, when the wake-up signal is other than the tuner signal, the signal carries less noise thereon and high frequency noise is eliminated by the hardware filter circuit. Thus, when the system judges at the step 101 the signal applied to the wake-up request terminal, the system can reliably determine it as a normal signal. Therefore, only once judgement causes the system to shift to the usual control. When judging at the step 101 that the input signal is from the tuner, the system determines the input signal is the wake-up request from the tuner and executes the operation of a step 102. Since the power supply to the tuner is intermittently carried out in the sleep mode, the input of the wake-up request. signal causes the system to output a change-over signal for continuous power supply. With it, the system can judge whether or not the subsequent signal is rightly input. The system judges at a step 103 whether the tuner signal is normal or not until the system judges at a step 104 that the tuner signal was fully input. The tuner signal is set in the present embodiment to be constituted of 50 msec. or more of a header signal having a period of 5 msec. and a duty cycle of 50% followed by encoded ID code and command. When judging before the full input of this tuner signal that the tuner signal is abnormal, the system, at a step 108, performs sleep operation to cause the MPU to stop its oscillating operation and enter again into the sleep mode. Only when the tuner signal is fully input, the system executes the operations of the steps 105 and 106 to initiate the other control units and to turn ON the second and third power supply circuits 32 and 33 to supply power to the entire circuits, and then starts at the step 107 the usual control operation. In this way, only when the tuner signal is fully normally input, the entire system is shifted to the usual operational mode. Although the entire system has been set to be shifted to the usual operational mode only when the tuner signal is fully input in the present embodiment, the shift to the usual control operation may be carried out. e.g., when only the header signal is fully input or when part of the header signal is input.

Figure 8:
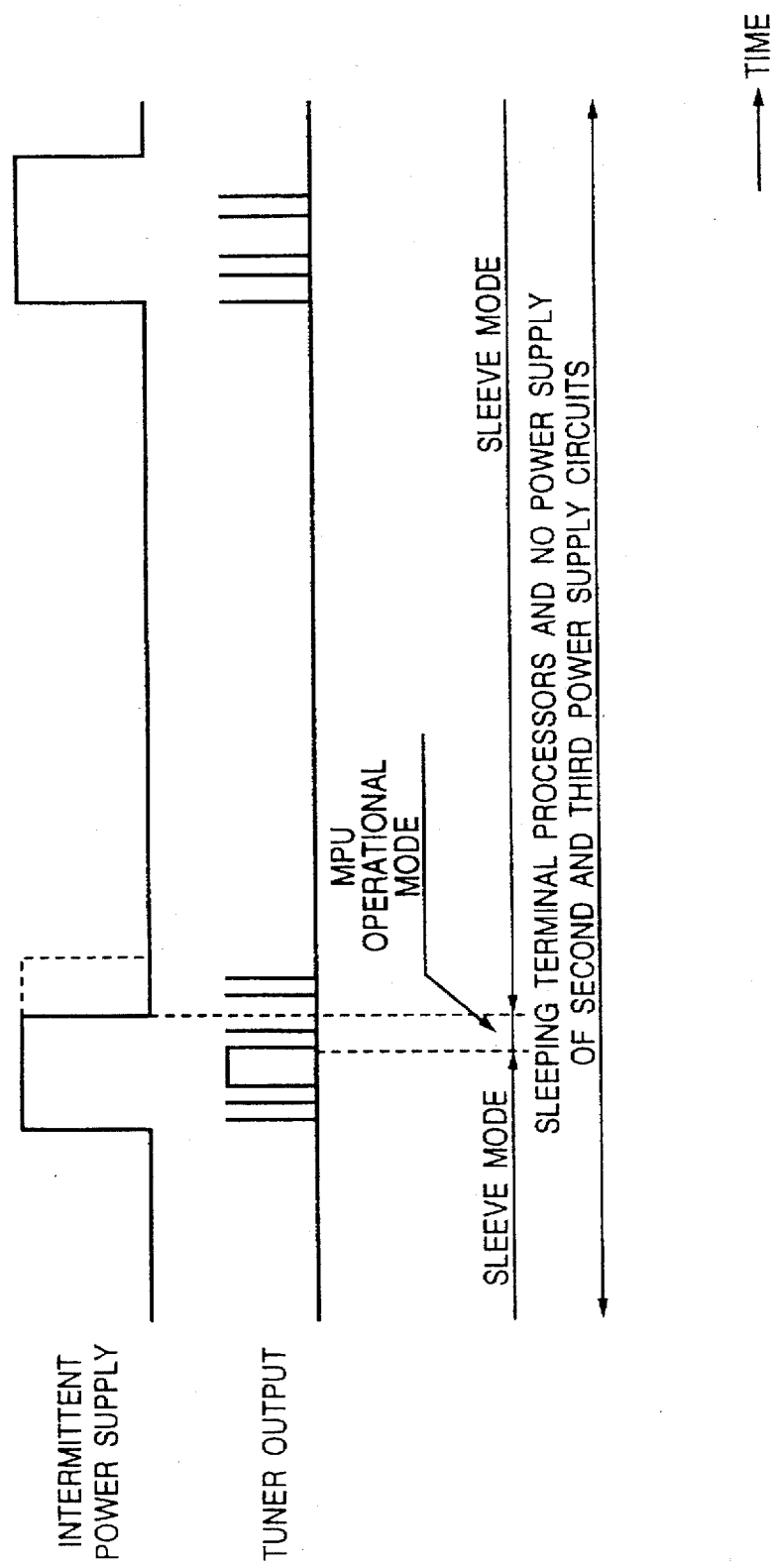
FIG. 8 shows waveforms of signals appearing in the embodiment of FIG. 6 for explaining how to detect an output of a tuner therein.
Figure 9:
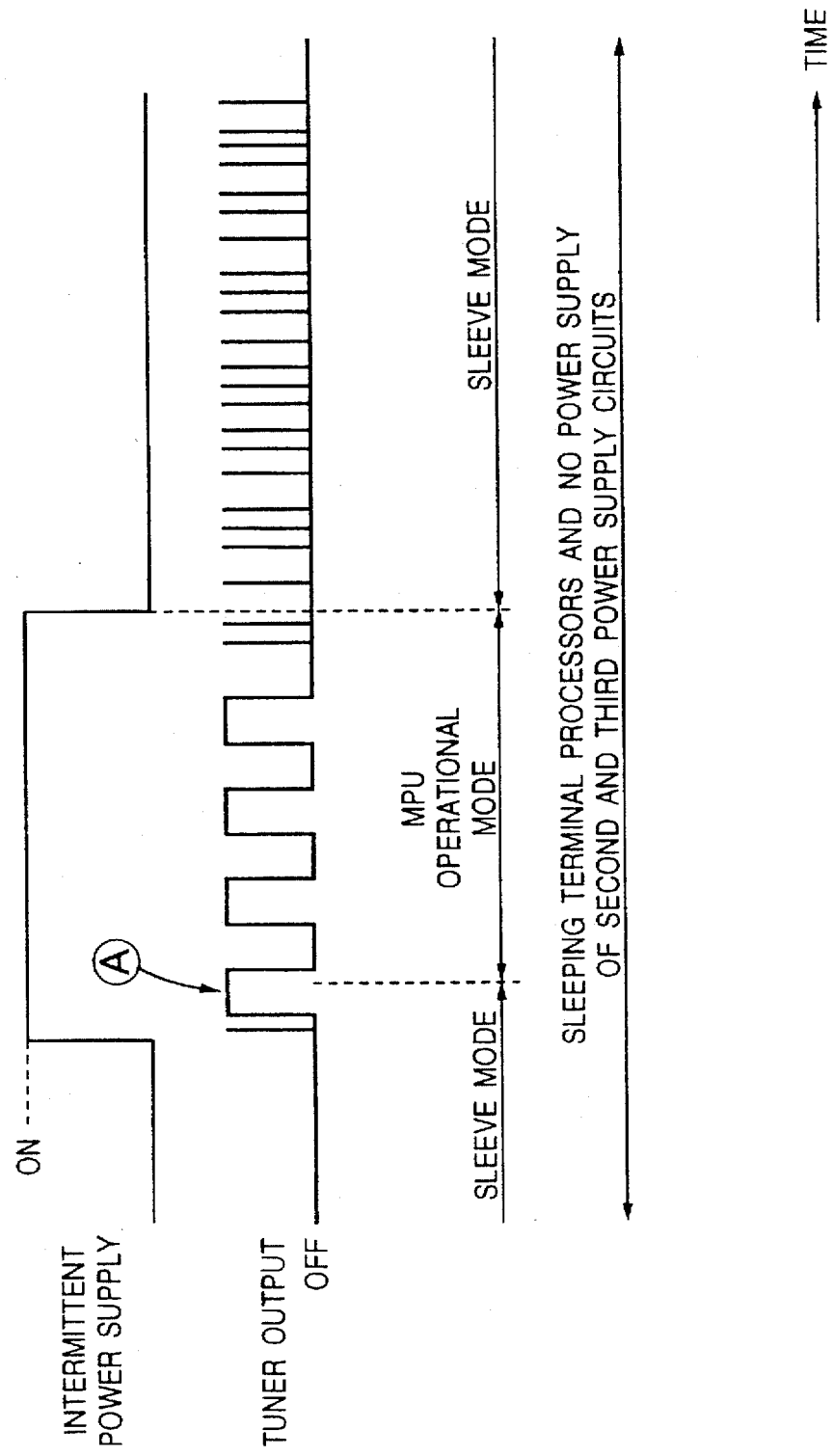
FIG. 9 shows waveforms of the signals appearing in the embodiment of FIG. 6 for explaining how to detect the output of the tuner therein.
Figure 10:
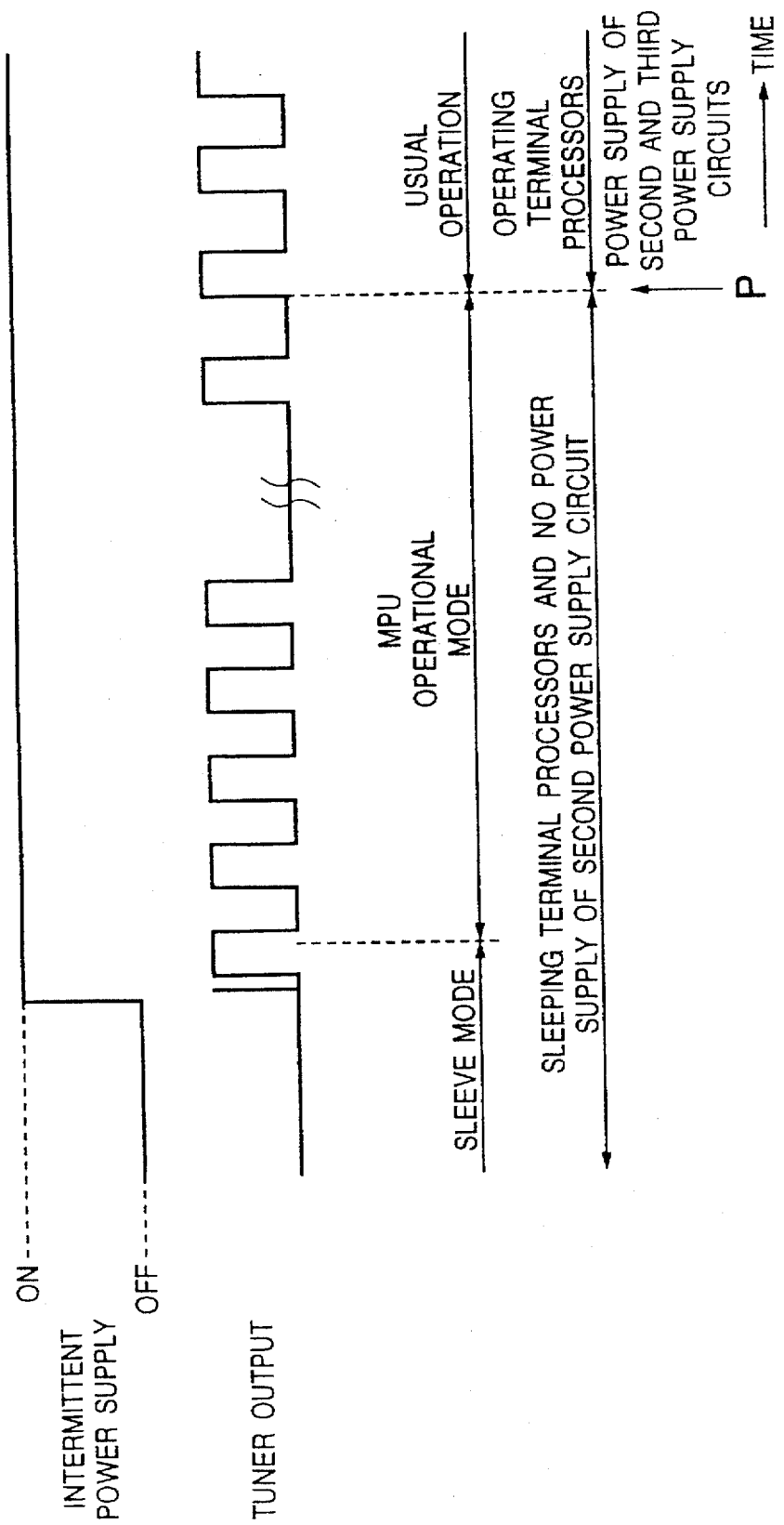
FIG. 10 shows waveforms of the signals appearing in the embodiment of FIG. 6 for explaining how to detect the output of the tuner therein.

Explanation will then be made as to the effects of the present embodiment. When power is intermittently supplied to the tuner, noise is also input due to the presence of any type of electromagnetic wave in the air. However, the noise is usually shifted in frequency band and has a pulse width much narrower than the normal signal. In addition, since the noise is eliminated by the hardware filter circuit, the noise will not be included in the wake-up request signal applied to the MPU. The noise, however, may have a pulse width similar to that of the normal signal. In such a case, the MPU wakes up. When the noise has such a waveform as shown in FIG. 8, the input of the noise signal having a pulse width similar to the normal signal causes the MPU to receive the wake-up request signal (step 105). The MPU starts its oscillating operation to execute the wake-up operation of FIG. 11. However, when the system is monitoring the tuner signal in the wake-up operation and immediately judges the signal is noise, this causes the MPU to be immediately put in the sleep mode, so that the terminal processors remain the sleep mode and the second power supply circuit also remains in the OFF state. When the system is put in the sleep mode, the power supply of the tuner power supply circuit to the tuner is once turned OFF and later the tuner power supply circuit performs its intermittent power supplying operation, which results in that the time duration of power supply to the tuner becomes shorter than that in the usual sleep mode and thus the current consumption of the tuner is suppressed. Further, even when such a signal A similar to the normal signal continues for some time as in FIG. 9, the system is not shifted to the usual control operation until the keyless signal is fully input, so that, as in FIG. 8, the terminal processors keep the sleep mode and the second and third power supply circuits 32 and 33 also remain in the OFF state. Furthermore, as in the prior art, once the system is put in the usual operational mode, it is necessary to put the terminal processors in the sleep mode or to judge whether or not the terminal processors have actually been put in the sleep mode. For this reason, after shifted to the usual control mode, even when the system judges that keyless signal is not normal and tries to shift the current mode to the sleep mode, the entire system fails to immediately shift to the sleep mode. In the present embodiment, on the other hand, after the system judges that the keyless signal is the normal signal, the system shifts the current mode to the usual operational mode, which results in that, when the system judges that the keyless signal is not the normal signal on the way, the entire system can immediately shift the current mode to the sleep mode. Accordingly, even when the keyless signal is not the normal signal, the MPU put in the operational mode simultaneously causes all controls to be put in the usual operational mode in the prior art; whereas, only when the keyless signal is normal, the terminal processors and the second power supply circuit are activated, thus suppressing current consumption in the present embodiment. FIG. 10 shows the operational state of the input tuner signal when the signal is normal.

In FIG. 10, more in detail, when a pulse signal having a pulse width having a predetermined value or more is detected as a tuner output and the pulse signal having the pulse width is continuously received up to a time point P where all the keyless signal is input; the system judges that the system is in the usual operational mode and completes the wake-up operation. After the time point P, the second and third power supply circuits 32 and 33 are operated to put the terminal processors in the operational mode.

In accordance with the present invention, since the control system is shifted to the usual operational mode only after the system judges whether or not a signal received at the receiver is the normal signal, even when the received signal contains much noise, the current consumption can be suppressed.

Figure 12:
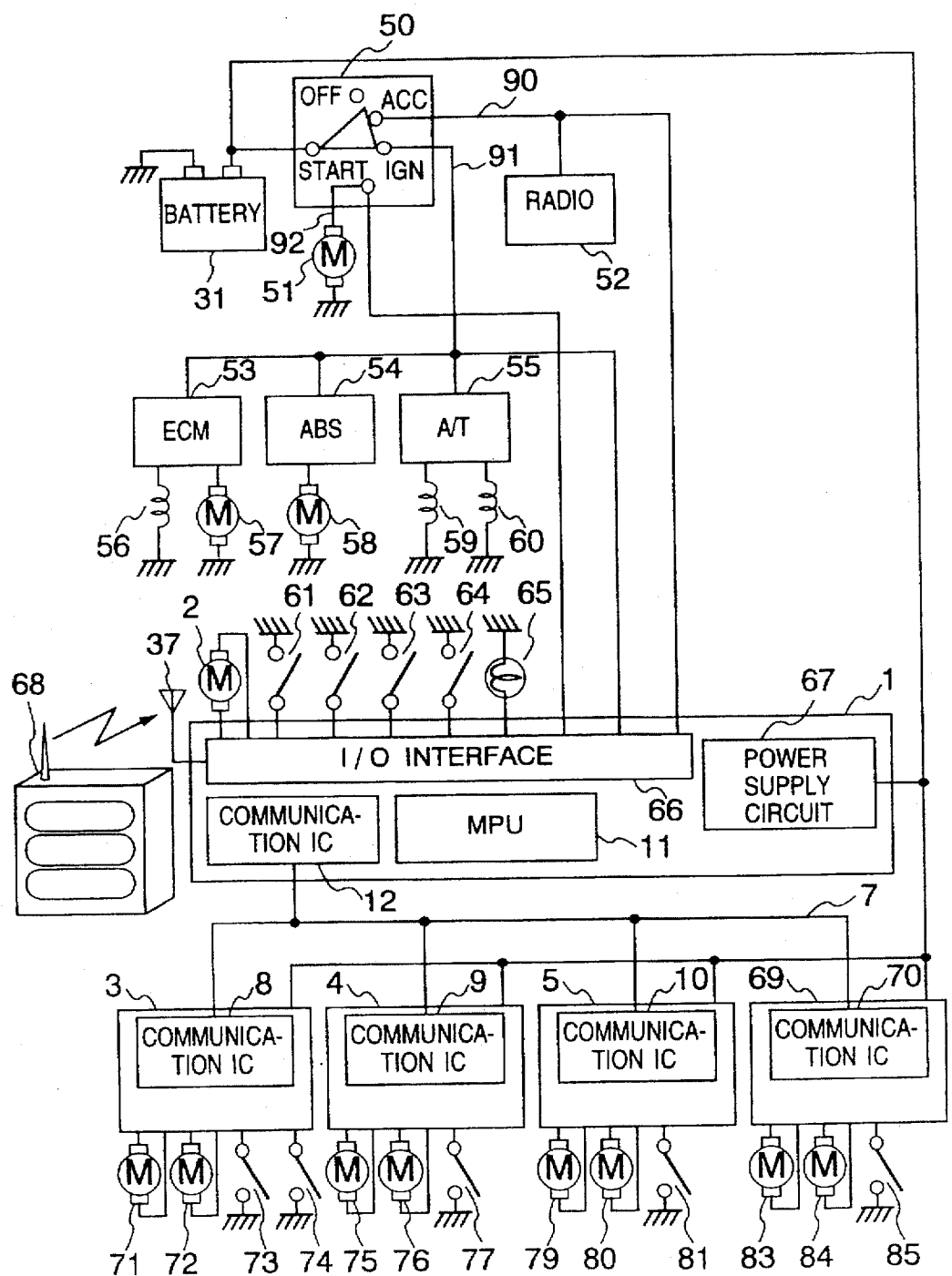
FIG. 12 is a block diagram of an arrangement of a system for an entire car.

Although the embodiment of the present invention has been explained above in connection with FIGS. 5, 6 and 7, the present invention will be explained in more detail in connection with a case where the present invention is applied as a car electronic control system. Referring to FIG. 12, there is shown a configuration of the entire car electronic control system. In the drawing, a battery 31 supplies power to the car electronic control system. Reference numeral 50 denotes an ignition key switch by which key position the battery power is distributed to different locations. That is, when the ignition key switch 50 is at a key position OFF, power supply lines 90, 91 and 92 are disconnected from the battery power so that no power is supplied; when the switch 50 is at an accessory.(referred to merely as the ACC, hereinafter) key position, the battery power is supplied only onto the power supply line 90; when the switch 50 is at an ignition (referred to merely as the IGN, hereinafter) key position, the battery power is supplied to the power supply lines 90 and 91; and when the switch 50 is at a starter (referred to merely as the START, hereinafter) key position, the battery power is supplied to the power supply lines 91 and 92, in which case the power supply line 90 is disconnected from the battery power. A radio set 52 is operated on power supplied from the power supply line 90. A starter motor 51, when the key switch is at the START position, is supplied with power from the power supply line 92 and is driven to start an engine. An engine control machine 53 (which will be referred merely as the ECM 53, hereinafter), when receiving an intake air amount or an engine rotational speed from a sensor (not shown), performs fuel injection control or ignition control to drive a fuel injection valve 56 (which will be referred to the injector 56, hereinafter), a fuel pump 57 and so on. An anti-lock brake system (ABS) controller 54 (which will be referred merely as the ABS controller 54, hereinafter) functions, even when an ABS motor 58 is controlled to apply abrupt braking operation, to prevent wheels from being locked. An automatic transmission (A/T) controller 55 (which will be referred to merely as the A/T controller 55, hereinafter) controls solenoids 59 and 60 and so on to automatically perform gear shifting operation over a transmission according to the driving state of the car. The ECM controller 53, ABS controller 54 and A/T controller 55 are designed to be operated when supplied with power from the power supply line 91, i.e., when the ignition key is at the IGN or START position.

Reference numeral 1 denotes a control processing unit (CPU) (which will be referred to merely as the CPU 1, hereinafter), and numerals 3, 4, 5 and 69 denote terminal processors. The terminal processors are interconnected to each other by means of a multiplex communication line 7 so as to transfer input information on switches or input information on actuators such as motors or lamps connected to the associated terminal processors therebetween on a multiplex communication basis to thereby realize general control. The CPU 1 and terminal processors 3, 4, 5 and 69 are supplied with power directly from the battery regardless of the position of the ignition key switch. The CPU 1 includes a power supply circuit 67 made up of such constant-voltage power supply circuit 30, second power supply circuit 32 and third power supply circuit 33 as shown in FIG. 5, an I/O interface 66 having such a tuner 38 as shown in FIG. 5, an MPU 11, and a communication IC 12. The operations of these elements have been already explained in the foregoing embodiment, and thus explanation thereof is omitted. Further, since the structures and operations of the terminal processors 3, 4, 5 and 69 are the same as those in FIG. 7. Thus explanation will centers, in particular, on constituent parts associated with the keyless entry system. Numeral 68 denotes a transmitter for the keyless entry system. An antenna 37 is used to receive a signal transmitted from the transmitter 68. Although the antenna is illustrated as provided outside of the CPU 1 in the present embodiment, the antenna may be mounted inside of the CPU 1 as necessary. Numeral 2 denotes a trunk opener motor for opening the trunk, 61 a key insertion switch for detecting the presence or absence of the key inserted in place, 62 a door switch for detecting an open or closed state of the door, 63 a rear defogger switch for controlling turning ON and OFF of the rear defogger, 64 a windshield wiper switch, 65 an illumination lamp for illuminating the rear defogger switch 63, windshield wiper switch 64 and the like. Such switches, lamp and motor as mentioned above are connected to the CPU 1. Also connected to the CPU 1 are signals ACC, IGN and START. The terminal processors 3, 4, 5 and 69 are mounted to the doors of driver and assistant driver's seats and the right- and left-side back seats and are also electrically connected with door lock motors 71, 75, 79 and 83 for locking or unlocking the associated doors and with power window motors 72, 76, 80 and 84 for opening or closing the door windows, respectively. Connected to the terminal processor 3 of the driver seat are a door lock switch 73 for locking or unlocking the doors of all the seats, a power window switch 74, other power window switches (not shown) of the seats other than the driver seat, and a door lock detection switch for detecting the locked or unlocked state of the doors. Connected to the terminal processors 4, 5 and 69 of the assistant driver's seat right- and left-side back seats are power window switches 77, 81 and 85.

Explanation will next be made as to the operation of the keyless entry system. The 'keyless entry system' as used herein refers to such a system as to lock or unlock car doors or to open or close the trunk room using a signal received from a radio device on a remote control basis. The keyless entry system, because of being operated on a remote control basis, is activated basically when no person rides in the car. When the key insertion switch is in its OFF state, i.e., when the key is not inserted, pushing of a lock switch of the transmitter causes the transmitter to transmit a lock signal (which will be detailed later). The signal is received at the antenna 37 and sent to the CPU 1. When CPU 1 judges that the received signal is the lock signal, the communication IC 12 in the CPU 1 issues via the multiplex communication line 7 to the communication ICs 8, 9, 10 and 70 of the terminal processors 3, 4, 5 and 69 such a signal as to drive the door lock motors 71, 75, 79 and 83 in such directions as to lock the associated doors respectively. The communication ICs 8, 9, 10 and 70 of the terminal processors 3, 4, 5 and 69, when receiving the aforementioned signal from the communication IC 12, output lock signals to the door lock motors 71, 75, 79 and 83 to lock the associated doors respectively. Similarly, pushing of an unlock switch of the transmitter causes the respective seat doors to be unlocked. Pushing of a trunk switch of the transmitter causes the CPU 1 to output a signal to the trunk opener motor connected to the CPU 1 per se to thereby open the trunk.

Generally speaking, such operations are carried out in such a manner that the transmitter user pushes the door lock switch on the transmitter when he or she gets off and leaves the car, the user pushes the transmitter door unlock switch while approaching the car to ride in, or the user pushes the transmitter trunk switch while approaching the car to put a shopping bag or bags in the trunk after shopping. To this end, as mentioned above, the CPU 1 and terminal processors 3, 4, 5 and 69 associated with the above are directly connected to the battery so as to be always supplied with power therefrom. Such a keyless signal, however, may be input immediately after the user leaves the car or may be input after a long period of time such as several hours or several days. In the latter case, the continuous energization of the terminal processors undesirably involves great current consumption. For the purpose of suppressing the power consumption of the battery, in this case, the terminal processors are put in the sleep mode. More specifically, the terminal processors are designed to be put in the sleep mode when the ignition key is in the OFF state or the key is not inserted yet, the doors are closed, no keyless signal is input, and all the loads are not activated at all. The operation of system in the sleep mode and the operation thereof in the wake-up mode have been already explained above and thus explanation thereof is omitted.

Figure 13:
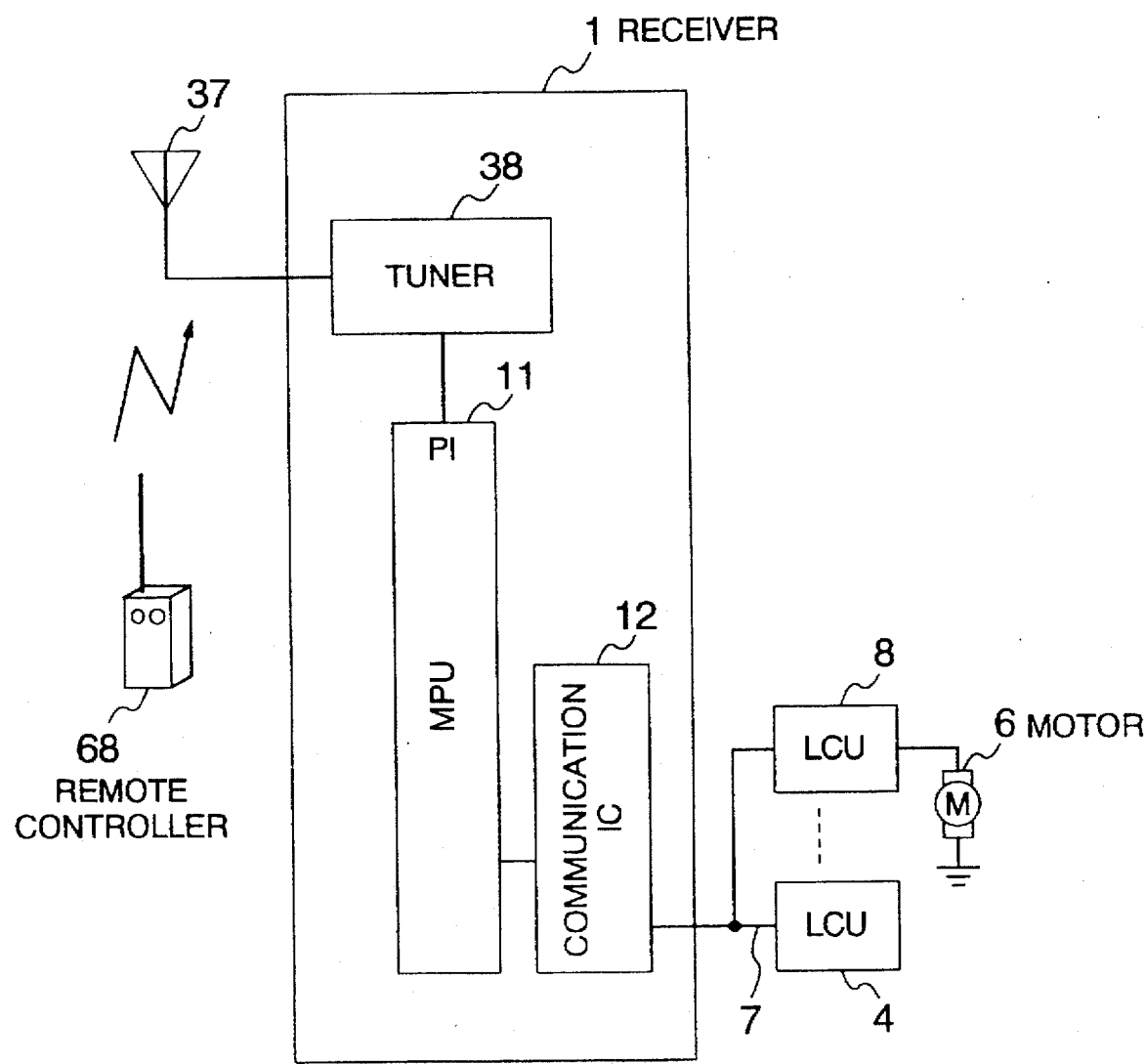
FIG. 13 is a block diagram of the central processing unit as a receiver.

Next, the keyless entry system will be explained in more detail. Shown in FIG. 13 is a configuration of the entire system. A remote control signal emitted from the remote controller or transmitter 68 is received at the antenna 37 and then sent to the tuner 38 built in the CPU 1 as a master or base station. The signal guided into the tuner 38 is converted to such a digital signal of high and low levels as seen in FIG. 14B and then applied to the MPU 11 at its terminal PI. The MPU 11 first decodes the remote control signal and extracts a key code. After completing the extraction of the key code, the MPU 11 then judges whether or not the key code is right. When determining that the key code is right, the MPU 11 outputs a signal to the communication IC 12 to drive the associated motor 6. The communication IC 12 is connected to the plurality of line control units (LCUs) or terminal processors as slave or branch stations through the multiplex communication line 7 to communicate therewith on a half duplex communication basis. The terminal processors have unique addresses that are not overlapped with each other, so that one of the terminal processors to communicate with is selected based on their addresses. The signal for driving the associated motor 6 is sent to the motor together with the address of the associated terminal processor to drive the motor 6.

FIGS. 14A, 14B and 14C show a key code signal issued from the tuner 38. The signal is roughly divided into 3 pattern parts A, B and B', and, of course, the remote control signal per se issued from the transmitter 68 is also divided into 3 parts.

More in detail, the part A corresponds to a preamble part of the signal in which high and low levels are regularly repeated in the signal waveform. The preamble part A is used for the MPU 11 to judge whether the signal issued from the tuner 38 is a noise signal or a remote control signal or to stabilize the operation of the tuner circuit.

The part B is a data part which forms a pulse width modulation (PWM) signal. The data part corresponds to a command part of the remote control signal issued from the transmitter 68 (command signal part). The part B is made up of a data head indicative of the head of the data, 8 bits (from bit 7 to bit 0) of command portion, and a parity bit.

The bit details of the command portion has such a waveform that '0' and '1' are distinguished according to the pulse width, as shown in the drawing. More specifically, when the pulse width is ($\frac{1}{3}$)T (T: period), the pulse indicates '0'; whereas, when the pulse width is($\frac{2}{3}$)T, the pulse indicates '1'. The interpretation of a command based on the distinguished '0' and '1' is known as "command signal analysis". The part B' similar to the part B is used to carry out again the command signal analysis in order to judge whether or not the result of the signal analysis of the part B by the MPU 11 is truly right. In other words, the part B' is used to judge whether or not the result of the signal analysis is employed depending on whether or not the signal analysis result of the part B coincides with the that of the part B'. That is, this means that two-successive signal collation is carried out. In this connection, it is unnecessary that the parts B and B' have exactly the same pattern. For example, an inversion of the signal of the part B may correspond to the part B' for inverted 2 successive-signal collation.

Figure 15A:
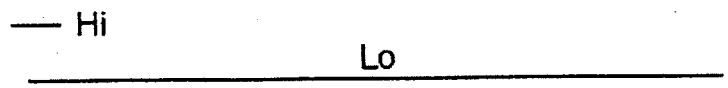
FIG. 15A is when noise is absent in the frequency band of the signal received at an antenna and FIG. 15B is when noise is present in the frequency band thereof.

FIG. 15 shows waveforms of the output signal of the tuner 38 when the CPU 1 fails to receive the remote control signal, wherein FIG. 15A is when noise is absent in the frequency band of a signal received at the antenna 37. The preamble part of the output signal of the tuner 38 has a continuous waveform always having a level Lo.

Figure 15B:
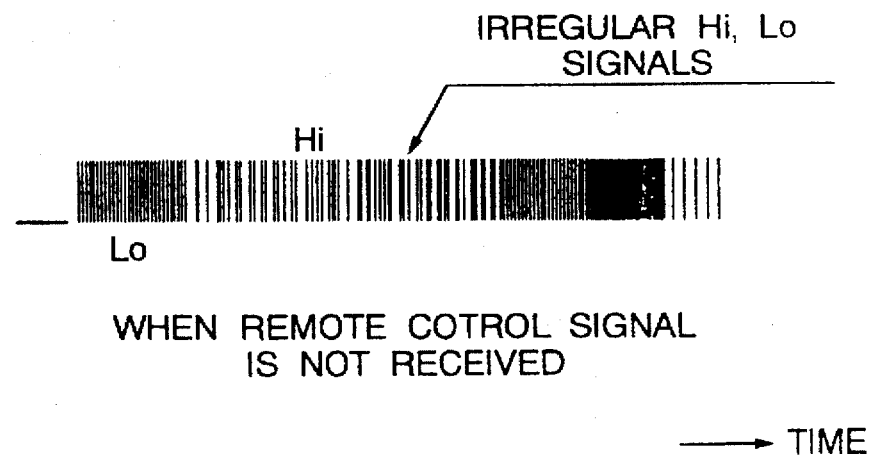
Figure 16A:
FIG. 16A is when the preamble part has no noise.
Figure 16B:
FIG. 16B is when the preamble part has noise.
Figure 16C:
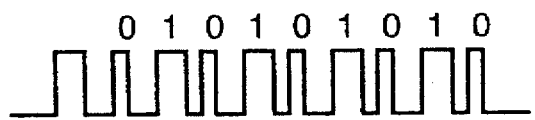
FIG. 16C is when the data part has no noise and FIG. 16D is when the data part has noise.
Figure 16D:

FIG. 15B is when noise is present in the frequency band of the received signal. That is, the preamble part of the signal has a irregular pulsative waveform.

Differences between such regular right waveform, continuous waveform and irregular fine pulsative waveform as mentioned above are detected on the basis of differences in the pulse period of 'Hi' and 'Lo' or in the pulse width to determine whether the remote control radio signal was received or the remote control signal is a noise signal.

First of all, explanation will be made as to the types of noise to be removed. The noise shown in FIG. 15 is called usually white noise, such as noise sound "Zaaa . . . " generated from an FM radio receiver when the radio receiver is failing to receive broadcasting electromagnetic waves. The receiver must distinguish the noise signal from the remote control signal. The next type of noise is high-frequency noise entrapped during the reception of the remote control signal. This noise is featured generally by its great energy and very narrow pulse width. In gasoline engines for use in automobiles or cars, in particular, fuel ignition is entailed by generation of ignition noise corresponding often to the above high-frequency noise. Accordingly, the receiver must eliminate the two types of noise, i.e., the white noise and high-frequency one-shot-like noise.

FIGS. 16A to 16D shows waveforms of a key code signal when a remote control signal is input in the absence or in the presence of noise. The waveforms with "noise" in the drawing locally contain high-frequency signal having narrow widths, that is, the original signal is 'polluted'. This noise signal corresponds to the latter type of noise in the above explanation.

When it is desired to restore an input signal, in general, the input signal is subjected to a sampling operation by a technique based on the sampling theorem to be restored according to the sampling period. However, if the noise position undesirably coincides with the sampling timing, then this means that it is impossible to execute the right sampling operation. To avoid this, the receiver is reduced in its sensitivity not to pick up the noise. This technique, however, also makes it difficult to pick up not only the noise but also the normal signal, so this is not a good idea. In accordance with the present invention, after the input signal is sampled with a sampling period, the input signal is again confirmed after passage of a time sufficiently shorter than the sampling period, whereby noise can be easily removed.

Figure 17:
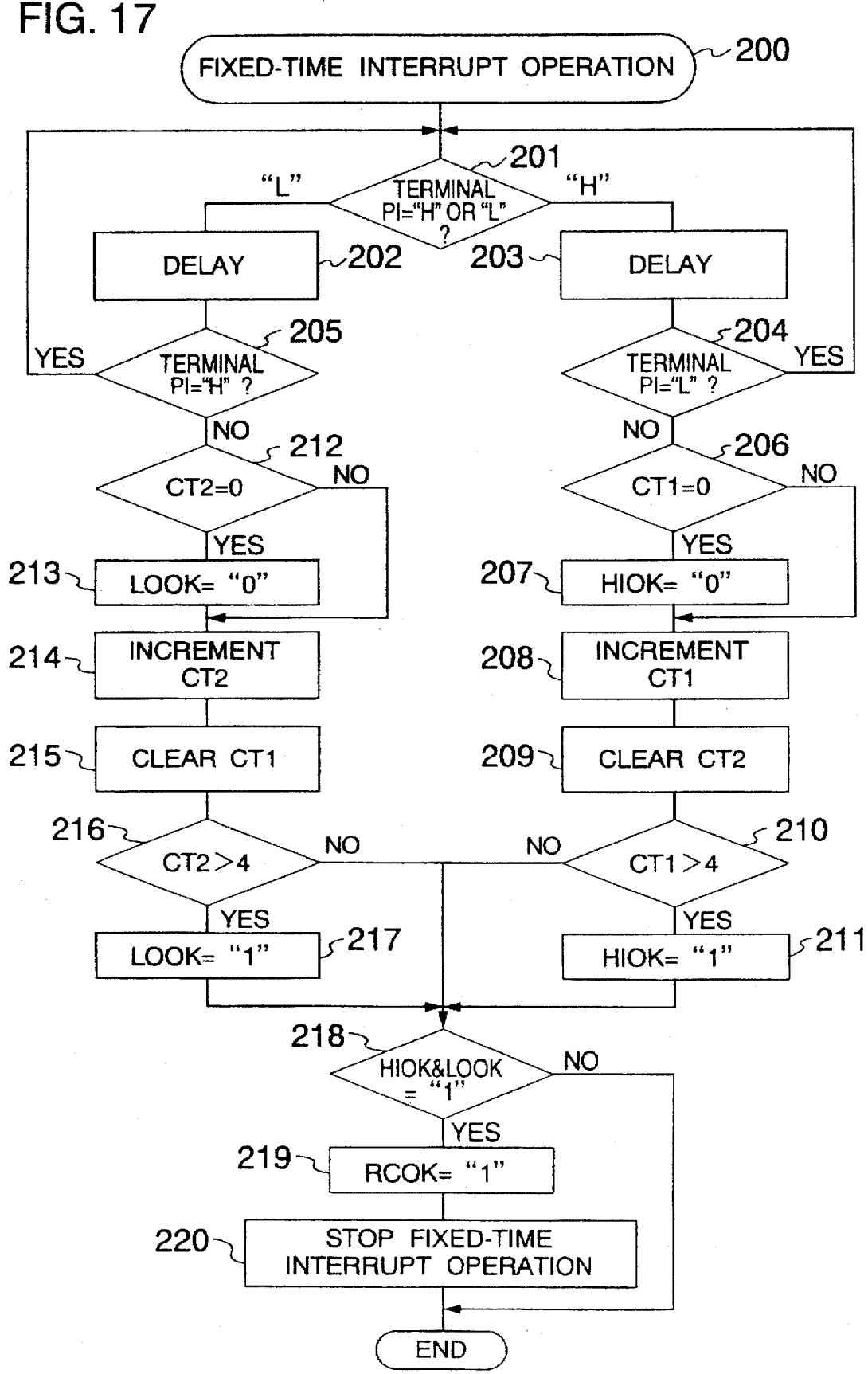
FIG. 17 is a flowchart for explaining how to avoid noise when sample timing coincides with noise.

Shown in FIG. 17 is a flowchart for explaining how to avoid such a case that the sampling timing coincides with noise position as mentioned above and how to distinguish the remote control signal from the white noise. A fixed-time interrupt operation 200 is basically executed at intervals of a sampling period set based on the sampling theorem to monitor a preamble part (part A) of the output signal of the tuner to judge whether the input signal is the remote control signal or the white noise.

More specifically, when the tuner output signal received at the terminal PI of the MPU 11 has a "H" level in a step 201, the MPU 11 provides a predetermined delay time at a step 203. This delay time is necessary to set a time corresponding to a pulse width of high frequency noise to be removed. Subsequently at a step 204, the MPU 11 again examines the state of the terminal PI. This is when the MPU 11 determined that the terminal PI has an "L" level state at the step 204, that is, when the MPU 11 once recognized the terminal state is "H" but the state was changed after the passage of the time delay of the step 203. This means that the recognition of the state at the terminal PI carried out at the step 201 or 204 is invalid. That is, the signal picked up noise at the step 201 or 204. Thus, the MPU 11 returns to the step 201 to re-examine the state of the terminal PI. This operation is repeated until the state of the terminal PI before the delay time of the step 203 coincides with that after the delay time in a 2 successive collation manner. Thus it will be seen from this operation that noise having frequencies (or having pulse widths shorter than) smaller than the delay time set at the step 203 is ignored. The same holds true for steps 202 and 205 except that the logic of the terminal PI is reversed to the steps 203 and 204. Explanation will next be made as to how the signal is specifically changed by referring to FIGS. 18A and 18B.

Figure 18A:
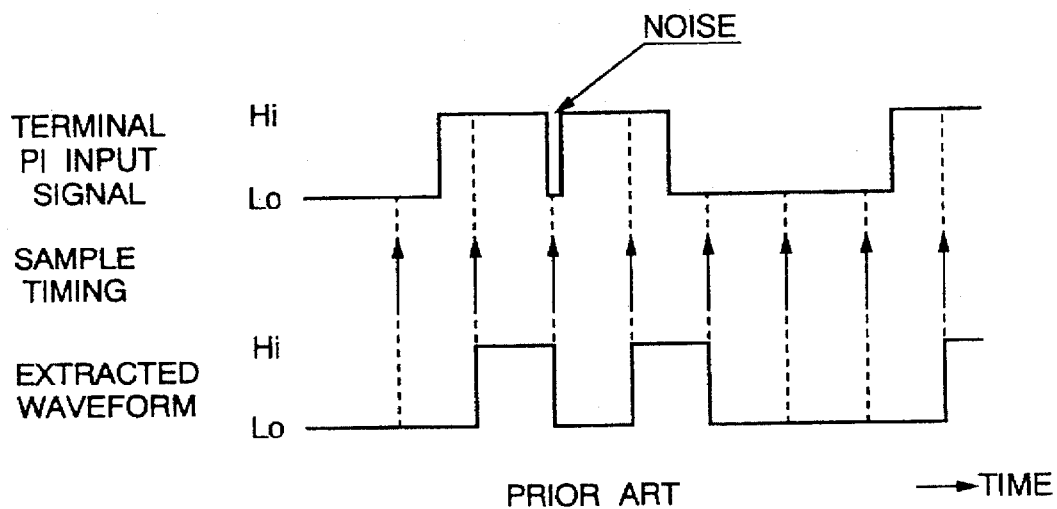
FIGS. 18A and 18B show waveforms of an input signal and an extracted signal in a prior art and in the present invention respectively.
Figure 18B:
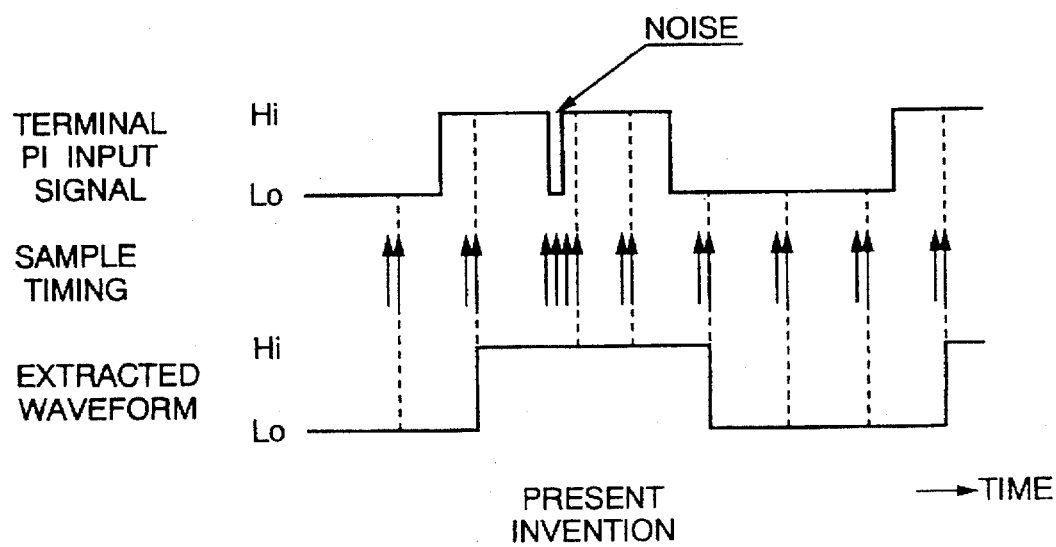

FIG. 18 shows a difference in the recognized (extracted) waveforms of the input signal of the terminal PI based on the present invention and a prior art when the input signal contains noise and the sample timing coincides with the noise position. More specifically, FIG. 18A is in the case of the prior art, in which, since the MPU 11 judges the noise as a signal, the extracted waveform collapses and thus the MPU 11 fails to perform correct waveform recognition. On the other hand, FIG. 18B is in the case of the present invention, in which the MPU 11 can perform correct waveform recognition through the 2 successive collation of the steps 201 to 205 in FIG. 17. In this way, in accordance with the present invention, it will be appreciated that, even when noise is entrained in the signal, the signal re-recognition is carried out until a coincidence is found between the terminal states through the 2 successive collation, which results in that correct waveform recognition can be carried out.

Turning again to the explanation of the fixed-time interrupt operation of FIG. 17, this interrupt operation basically monitors the preamble part (part A) in the output signal of the tuner to judge whether the signal is the remote control signal or white noise signal, as already mentioned above. After the MPU 11 finishes the operation when the sample timing coincides with the noise position, the MPU 11 checks at a step 206 whether or not a counter CT1 is 0. In the case of 0, the MPU 11 clears a flag HIOK at a step 207.

Subsequently, the MPU 11 increments the counter CT1 at a step 208 and clears a counter CT2 at a step 209. When the counter CT1 exceeds 4 at a step 210, the MPU 11 sets the flag HIOK at a step 211.

When the terminal PI is not in the "H" level state at the step 205, the MPU 11 checks at a step 212 whether or not the counter CT2 is 0. If 0 then the MPU 11 clears a flag LOOK at a step 213.

Then the MPU 11 increments the counter CT2 at a step 214 and clears the counter CT1 at a step 215. If the counter CT2 exceeds 4 at a step 216, then the MPU 11 sets the flag LOOK at a step 217.

The MPU 11 judges at a step 218 whether or not the flags HIOK and LOOK are both set. When the flags are set, the MPU 11 sets flag RCOK at a step 219, that is, judges that the input signal is the remote control signal. And at a step 220, the MPU 11 stops the fixed-time interrupt operation.

As mentioned above, the noise/signal distinction is carried out based on the pulse width or pulse period of the aforementioned part A of the "Hi" and "Lo". In the present embodiment, when the pulse width and period of the "Hi" and "Lo" are regularly repeated, the MPU 11 determines that the input signal is the remote control signal.

In this connection, the MPU 11 has a pulse width measuring function of storing time moments at which rising edges in the input signal the signal is applied to the terminal PI and at which a falling edge in the input signal the signal is applied to the terminal PI. Using this function, the MPU 11 usually can precisely measure the pulse width or period. To this end, such a technique as shown in FIG. 17 is employed. When much white noise is input, this causes the operation based on the pulse width measuring function to be repeated many times, which disadvantageously makes it impossible to execute the other operations. The employment of the technique of FIG. 17 is for the purpose of avoiding such a problem.

As has been explained above, in accordance with the present invention, the separation between the white noise and remote control signal is first carried out according to the procedure of FIG. 17 and then the analysis of the remote control signal is carried out using the pulse width measuring function of the MPU 11, which advantageously results in that, even when the system is used in a bad noisy environment, the analysis of the remote control signal can be accurately realized. In this connection, it is necessary that the fixed-time interval of the fixed-time interrupt operation, the counting frequency of the counters, etc. be adjusted according to the different waveforms of the remote control signal and noise or to the different sampling methods so as to positively realize the noise/signal distinction.

Figure 19:
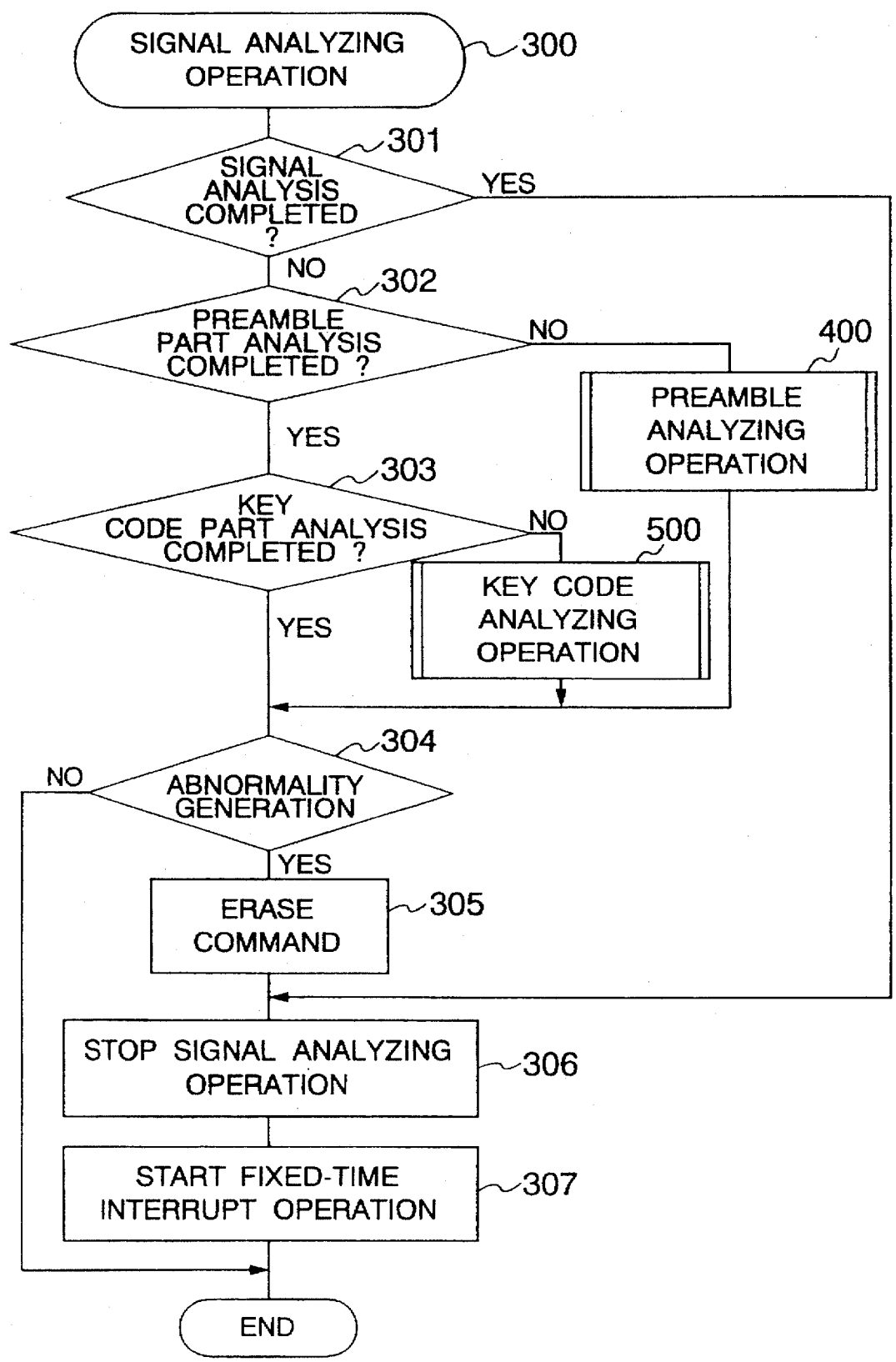
FIG. 19 is a flowchart for explaining signal analyzing operation.

Next, explanation will be directed to the analyzing operation of the remote control signal. FIG. 19 is a flowchart for explaining how to recognize the key code in the remote control signal applied to the terminal PI using the pulse width measuring function of the MPU 11. This analyzing operation is automatically initiated by the flag RCOK="1". This initiating method does not form an essential part of the present invention and thus explanation thereof is omitted.

Figure 20:
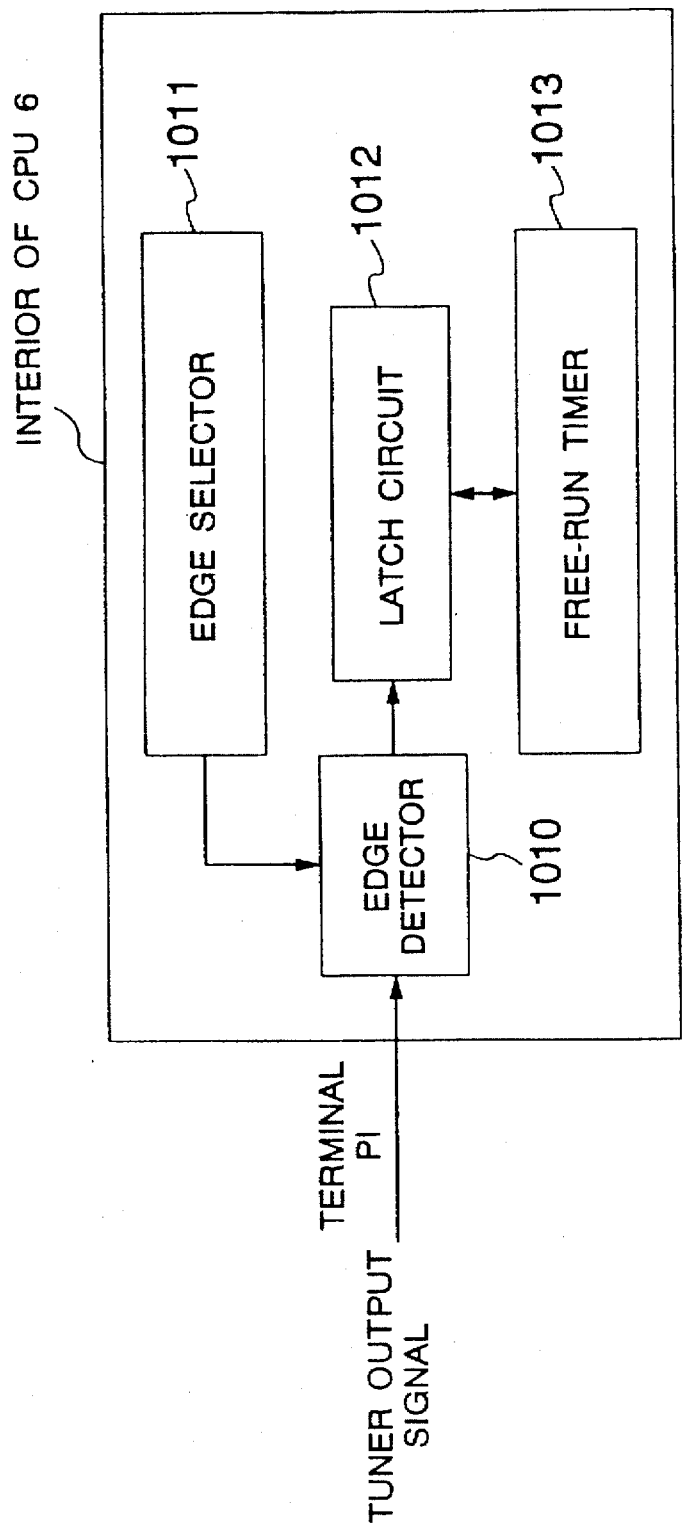
FIG. 20 is a block diagram for explaining the operation of interior of the central processing unit.

Explanation will first be made as to the pulse width measuring function of the MPU 11. FIG. 20 schematically shows the pulse width measuring function. An edge detector 1010 selects catching of a rising edge in the tuner output signal or catching of a falling edge therein according to a command issued from an edge selector 1011 to always observe the signal applied to the terminal PI. The command of the edge selector 1011 can be arbitrarily selected on a software basis. A latch circuit 1012 holds a current value of a free-fun timer 1013 on the basis of an edge detection signal received from the edge detector 1010. The free-fun timer 1013 comprises a 16-bit counter which continually performs its counting-up operation always in a constant time (1 μsec in the present embodiment), that is, which counts up from $0000 to $FFFF and, when exceeding $FFFF, again starts its counting up operation from $0000. In other words, when receiving the command from the edge selector 1011 to catch the rising edge, the edge detector 1010 monitors the rising edge in the signal applied to the terminal PI in such a manner that, when the edge detector 1010 inputs the rising edge, the then value of the free-fun timer 1013 is held in the latch circuit 1012.

Figure 21:
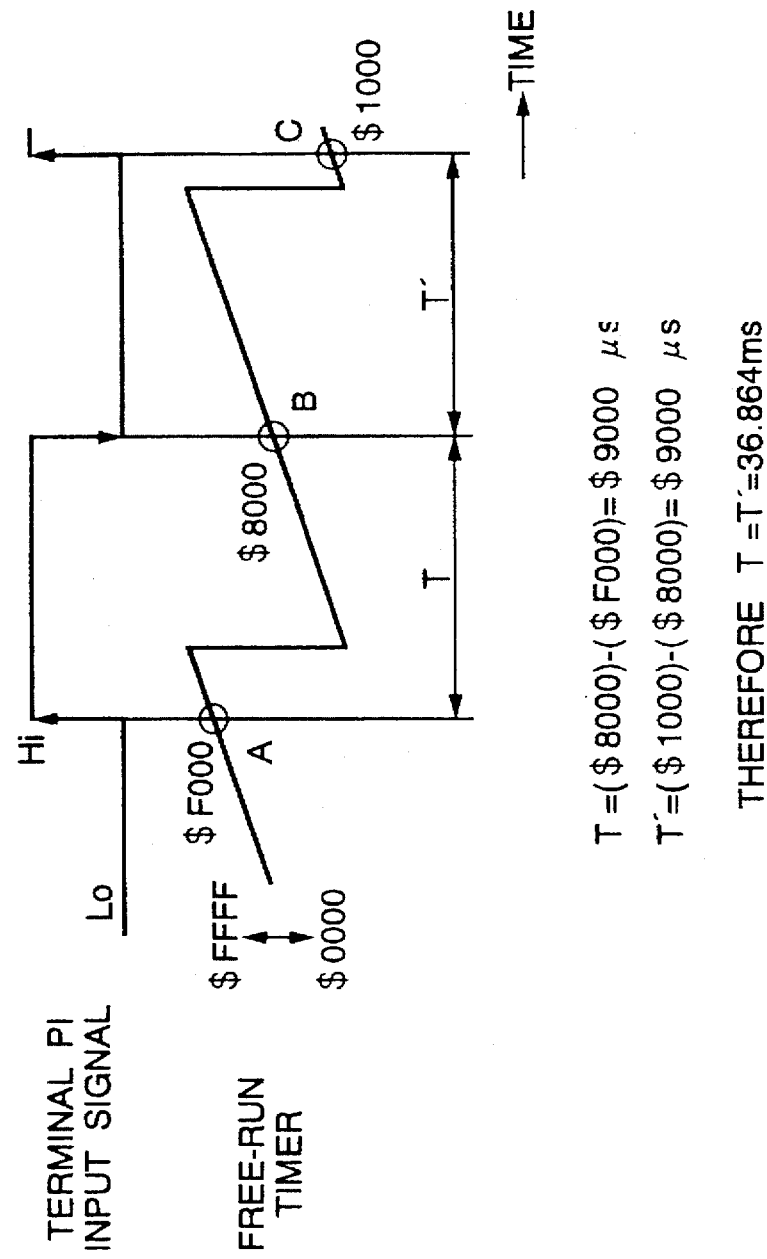
FIG. 21 shows waveforms of signals for explaining how to measure pulse width.

Explanation will then be made as to hoe to measure the pulse width with reference to FIG. 21 showing the input signal of the terminal PI and the value of the free-fun timer 1013. In the drawing, the free-run timer has a caught value of $F000 at a first rising edge point A of the PI terminal input signal, has a caught value of $8000 at a next falling edge point B and has a caught value of $1000 at a next rising edge point C. Since time axis is set to be directed from the left to the right in the drawing, a pulse width T during which the input signal of the terminal PI has a level of "Hi", corresponds to a subtraction of the count value at the point A from the count value at the point B. Similarly, a pulse width T' during which the terminal input signal has a level of "Lo", corresponds to a subtraction of the count value at the point B from the count value at the point C. Since a time taken for one count of the free-run timer is 1 μsec, the respective times T and T' can be easily found by multiplying the count value by 1 μsec. Accordingly, the time T is ($8000)–($F000)= $9000. Similarly, the time T' is ($1000)–($8000)=$9000. These values are represented in hexadecimal notation. Thus when these values are converted to decimal values and then to time values, the time of 36.864 msec is obtained. It will be appreciated that the pulse width or period can be freely measured by setting a falling or rising edge in the signal of the terminal PI.

Turning again to the signal analyzing operation of FIG. 19, explanation will be made as to how to receive the remote control signal and as to how to remove noise when high-frequency noise is included in the remote control signal during the reception of the remote control signal. First, the general flow of the signal analyzing operation will be explained. When the MPU 11 recognizes through the fixed-time interrupt operation of FIG. 17 that the remote control signal was input, the MPU 11 starts the signal analyzing operation of FIG. 19. When the signal analysis is completed at a step 301, the MPU 11 jumps to a step 306 to stop the command signal analyzing operation and at a step 307, initiates and completes the fixed-time interrupt operation, thus returning to a remote control signal wait state.

When the signal analysis is not completed yet, the MPU 11 judges at a step 302 whether or not the analysis of the part A (preamble part) is completed. When the analysis is not completed yet, the MPU 11 goes to a step 400 to continuously execute the analysis of the part A. The analysis of the part A at the step 400 is for the purpose of reconfirming that the signal/noise distinction carried out in FIG. 17 is truly correct.

When the detection of the part A is completed, the MPU 11 checks at a step 303 whether or not the analysis of the part B (data part) is completed. When the analysis of the part B is not completed yet, the MPU 11 continuously executes the analysis of the part B at a step 500. The key code analysis is actually carried out at this step 500.

The MPU 11 checks at a step 304 a difference between the signal and noise in the pulse width, pulse period and pattern or such an abnormality as the timeover of data frame. In the presence of an abnormality, the MPU 11 erases the analyzed command at a step 305. At the next step 306, the MPU 11 stops its own command signal analyzing operation, and initiates and completes at the step 307 the fixed-time interrupt operation.

Explanation will next be made as to the preamble analyzing operation of the step 400. In this operation, the part A of the remote control signal is analyzed as already mentioned above. The part A has such a regular correct square waveform having a duty cycle of 50% as shown in FIG. 14. In the present embodiment, only when such a signal part continues for a predetermined time TM1, the MPU 11 judges that the signal part corresponds to the head of the remote control signal.

Figure 22:
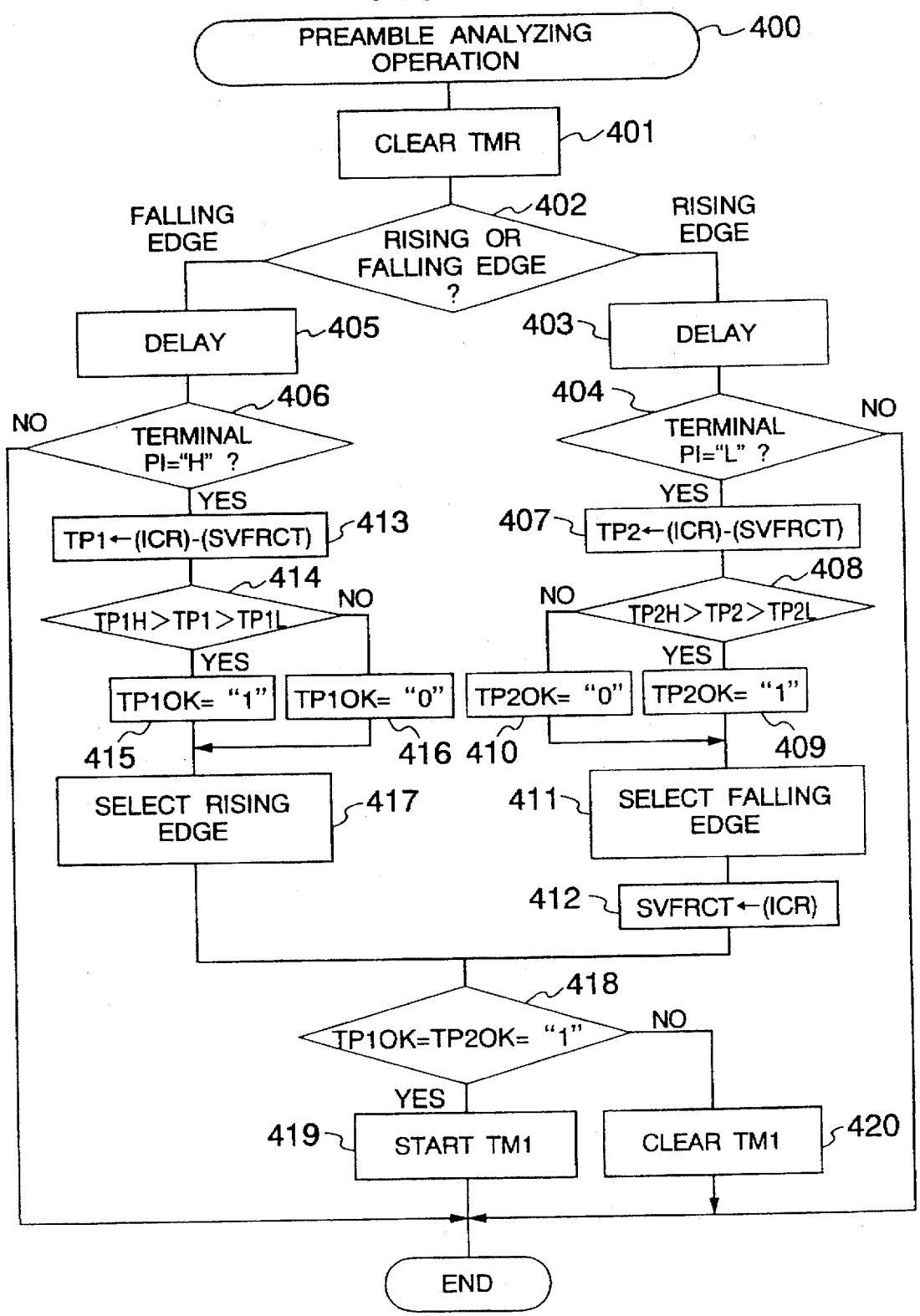
FIG. 22 is a flowchart for explaining how to analyze a preamble signal.

Shown in FIG. 22 is a flowchart for explaining the preamble analyzing operation. The MPU 11 first clears the timer TMR at a step 401. This timer, which performs its counting-up operation based on a fixed-time interrupt operation different from the fixed-time interrupt operation of FIG. 17, eventually measures an edge interval of the signal at the terminal PI. The signal analyzing operation of FIG. 19 is initiated only in response to the presence of the input signal.

Thus, when the input signal becomes null, the signal analyzing operation is not initiated and remains without being initiated indefinitely. To avoid this, this timer is used to cause the MPU 11 to detect the absence of the input signal applied to the terminal PI (i.e., the absence of the remote control signal), to interrupt the signal analyzing operation and to return the current operation to the initial state. Thus, even when the remote control signal breaks off after starting of the remote control signal analyzing operation, the MPU 11 can recognize its abnormality and retry it from the beginning, thus realizing the execution of the signal analysis without waste time.

At a step 402, the MPU 11 judges whether the input edge is rising one or falling one. When the input edge is rising one, the MPU 11 waits for a certain time at a step 403. After this, the MPU 11 confirms the level of the input signal at the terminal PI at a step 404. When the input signal has a level of "L", that is, when the signal does not rise though the MPU 11 catches the rising edge in the input signal of the terminal PI, the MPU 11 can regard the caught signal as a high frequency noise signal. At this stage, the MPU 11 interrupts the operation and finishes the operation of the step 400 to get ready for a new input signal. Similarly, when the MPU 11 judges at the step 402 that the input edge is falling one, the MPU 11 goes to a step 405 to provide a delay time and then goes to a step 406 to confirm the level of the input signal. When the input signal has a level of "H" though the MPU 11 catches the falling edge, the MPU 11 judges the input signal is a high frequency noise signal and finishes the operation of the step 400.

Figure 23:
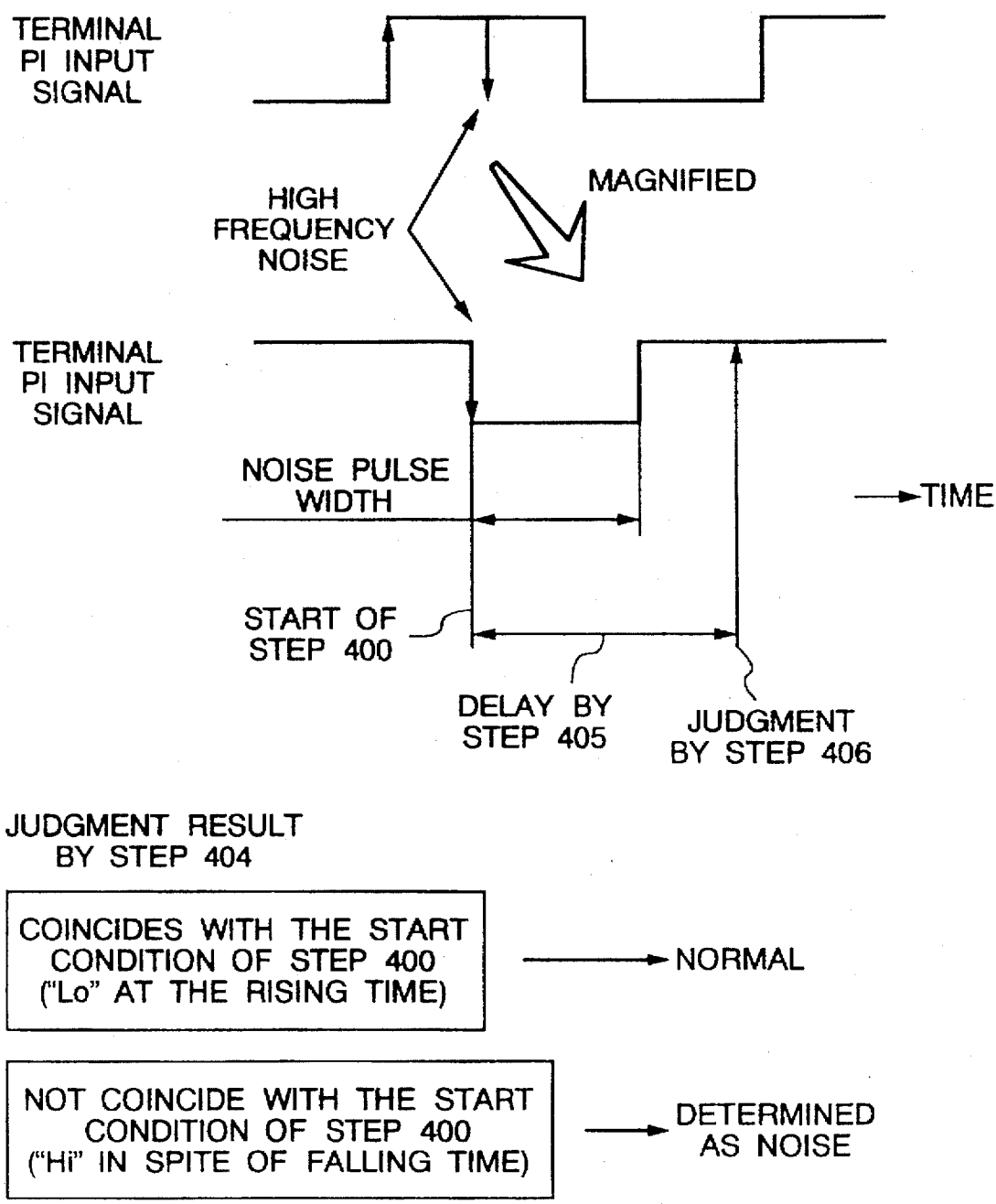
FIG. 23 is a waveform of the input signal for explaining how to analyze the preamble signal.

The operations as far as this stage will be explained by referring to FIG. 23. The drawing shows a waveform of the remote control signal applied to the terminal PI, an enlarged waveform of the remote control signal having high frequency noise (such as car ignition noise or the like) carried thereon, and the effects of the respective steps 405 and 406. In general, high frequency noise is characterized by having a narrow pulsative width. Utilizing this feature, the present invention is designed to eliminate the noise. It is assumed in FIG. 23 that, when the MPU 11 tried to detect the next falling edge to measure its pulse width following the detection of a rising edge in the remote control signal during analysis of the preamble signal, noise was input to the remote control signal.

When the falling edge of the signal is applied to the terminal PI and the MPU 11 initiates the signal analyzing operation of FIG. 19, the MPU 11 executes the preamble analysis operation of the step 400. Because of the falling edge, the MPU 11 first provides the delay time at the step 405 to wait for a certain time. Since this delay time is data to vary depending on the pulse width of noise to be eliminated, its exact value cannot be determined unconditionally. After this, the MPU 11 checks the level of the signal at the terminal PI at the step 406. Now that the initiation condition of the step 400 was satisfied, that is, that the MPU 11 caught the falling edge, the signal naturally should have a level of "L". When the signal has a level of "H" in spite of the above fact, however, it is considered that pulse shorter than the delay time of the step 405 was input. Since the pattern of the remote control signal applied to the terminal PI is naturally known on the receiver side, the MPU 11 can readily judge that such a short signal is an abnormal signal (noise). Accordingly, even when high frequency noise is input a plurality of times, the MPU 11 can judge that these are all noise. In this connection, when noise is present in the vicinity of the edge of the correct remote control signal, this noise might be judged as a normal signal. However, since an error caused by this noise takes place for a time corresponding to the above delay time, this noise continues for a time is too small to be significant. In the present embodiment, for example, the normal remote control signal has a pulse width of about 2 msec. whereas the sustained time (delay time) of noise to be removed is about 10 μsec.

Since the present invention can completely separate the high frequency noise from the normal remote control signal through such operations as mentioned above, the invention can provide a signal analysis technique which is immune to noise environment.

Turning again to FIG. 22, explanation will be continued. When first detecting a rising edge, the MPU 11 passes through the steps 403 and 404 and goes to a step 407 to measure a time TP2. At the very beginning, there is no data at a time SVFRCT at which the previous rising edge was input. Thus, the value of a pulse period TP2 is unreliable so that the MPU 11 finds NO at a step 408, executes the operation of a step 410 to find a relation of TP2OK="0". The flag TP2OK is used to judge whether or not the pulse period TP2 is normal. At a next step 411, the MPU 11 causes the edge selector 1011 in FIG. 20 to be switched so as to select a falling edge. At a next step 412, the MPU 11 stores the time of the rising edge in the time SVFRCT. Thus it will be understood that the data of the time SVFRCT indicates a time at which the rising edge of the signal applied to the terminal PI was input. At a step 418, the MPU 11 judges whether or not the flags TP1OK and TP2OK are both "1". In this case, since the both flags are not both "1" (NO), the MPU 11 goes to a step 420 to clear a timer TM1. The timer TM1 starts and counts up like the timer TMR at the step 401 when the flags TP1OK and TP2OK are both "1". This timer is used to judge the completion of detection of the preamble only when the preamble was continuously detected for a certain time. This timer also prescribes a time after the completion of the preamble detection until the next key code analyzing operation starts. In the present embodiment, for the purpose of recognizing the remote control signal more reliably, there are provided the timer TMR for detecting a break or interruption in the remote control signal, the timer TM1 for prescribing a limit time from the detection of the preamble signal to the start of the key code analysis, and a timer TM2 for prescribing a limit time from the start of the key code analysis to the completion of the analysis. Though not described in the present embodiment, when the timer TM1 expires its preset time, the MPU 11 issues a sign signal indicative of the completion of the preamble part analysis at the step 302 to give a clue to the next step 303, or detects an abnormality to initialize the signal analyzing operation to quickly get ready for a next input of the remote control signal.

The storage of data in the time SVFRCT means to have determined a reference time. Further, since the terminal PI is set so as to catch the next falling edge, the terminal gets ready for the next falling edge.

An input of the falling edge causes the MPU 11 to pass through the step 402, 405 and 406 and to go to a step 413 to measure a time TP1. Symbol ICR denotes the value of the free-run timer caught by the latch circuit 1012 in FIG. 20. Accordingly, when the time SVFRCT is subtracted from the value ICR, a time necessary from the rising edge to the falling edge is found. It will be noted that the found necessary time corresponds to the pulse width of the "Hi" duration in the signal applied to the terminal PI. It will also be easily appreciated that the aforementioned pulse period TP2 corresponds to a time duration from the rising edge to the rising edge, i.e., the pulse period. Further, TP1L, TP1H and TP2L, TP2H are tolerance limit ranges for judgement of the input signal as a normal signal having the respective times TP1 and TP2. As will be seen, when the times TP1 and TP2 are within their tolerance ranges, the flags TP1OK and TP2OK are set; whereas, when the TP1 and TP2 are out of their tolerance ranges, these flags are cleared.

Figure 24:
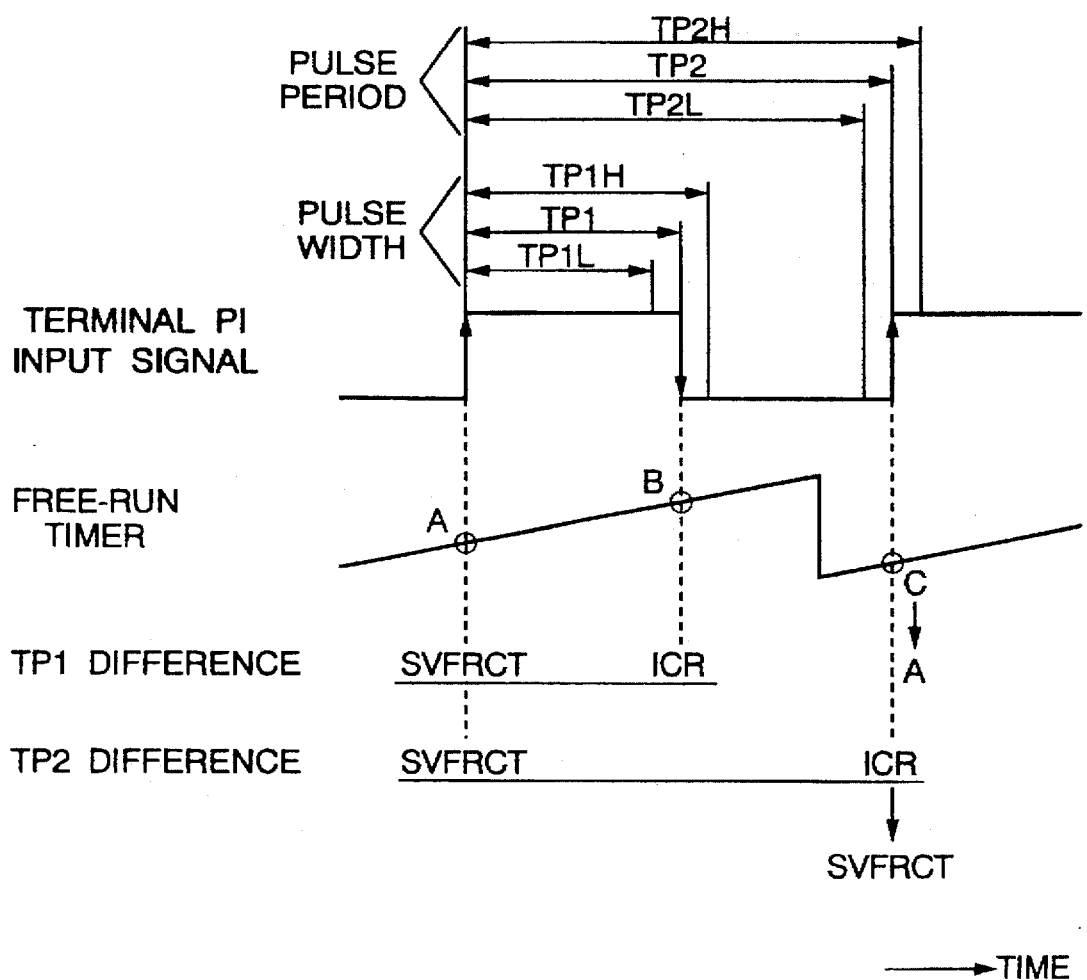
FIG. 24 shows waveforms of an input signal at a terminal PI and a free-run timer signal for comparison therebetween.
Figure 25:
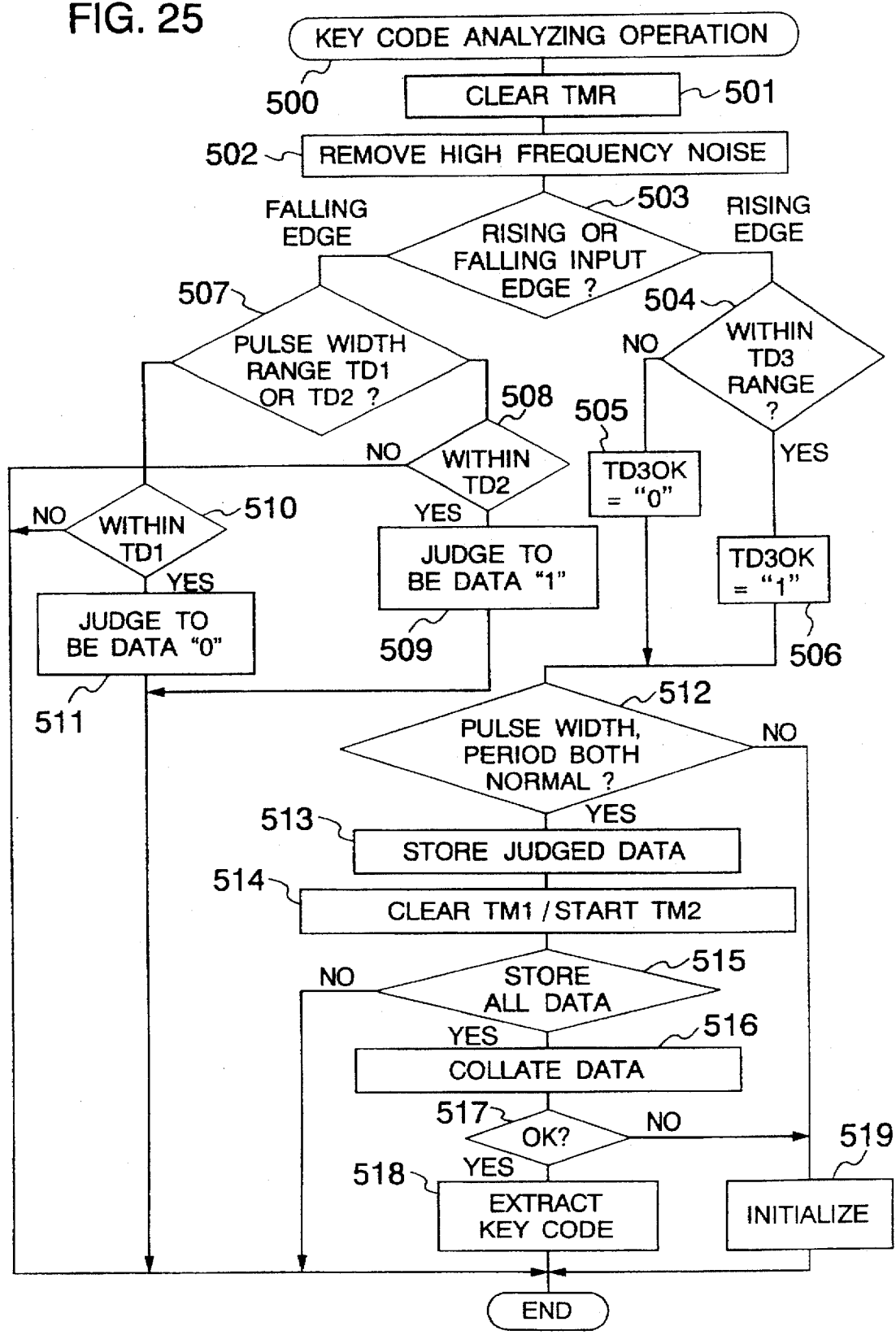
FIG. 25 is a flowchart for explaining the operation of the entire system.

Shown in FIG. 24 is a relationship among these data and limit values. It will be noted from the drawing that the time TP1 indicates a pulse width, TP1H and TP1L are tolerance ranges thereof, the time TP2 indicates another pulse width, TP2H and TP2L are tolerance ranges thereof, the TP1 corresponds to a difference between points B and A of the free-run timer, the TP2 corresponds to a difference between points C and A, and measurement is sequentially repeated.

It will be appreciated from the foregoing explanation that the preamble part analyzing/detecting operation of FIG. 22 can be immune to noise environment.

Explanation will next be made as to the key code analyzing operation of the step 500 in FIG. 19. At a first step 501, the MPU 11 clears the timers TMR and TM1 and executes the timer TM2 start judging operation. The timer TMR similar to that used in the step 401 in FIG. 22 is used for the same purpose and thus explanation thereof is omitted. At a step 502, the MPU 11 performs high-frequency noise removing operation. This noise removing operation is the same as the contents already explained in FIGS. 22 and 23 and thus explanation thereof is omitted. At a next step 503, the MPU 11 confirms the presence or absence of an input edge, that is, judges whether the input edge is rising one or falling one. In the case of the falling edge, the pulse width measurement is carried out as mentioned in FIG. 22. In the case of key code, a means for distinguishing between data "0" and "1" depending on the magnitude of the pulse width is added. Which has been already explained in connection with FIG. 14. In the operations of from the step 507 to a step 511, the MPU 11 judges the data "0" or "1" depending on whether the falling edge position is within a pulse width or range TD1 or TD2. When the falling edge is out of the range, the MPU 11 immediately stops the operation. This means that signals outside of the judgement ranges are ignored, or to the contrary, that any data is judged as normal so long as the data is within the judgement ranges. Assume now that a remote control signal similar in pattern to that in the present embodiment was input. Then this signal can be easily judged as correct data disadvantageously. This disadvantage is eliminated by repetitively inputting its data part a plurality of times. In other words, the frame of the input data part is examined on a multiple successive collation basis to judge whether to be genuine (parts B and B' in FIG. 14).

In this way, in accordance with the present invention, since a signal similar to the remote control signal is positively input, this helps improve the reception sensitivity; while, since the input data is examined on a multiple successive collation, this helps secure the data reliability, thus realizing provision of a noise-immune receiver.

When judging at the step 503 the input edge is rising one, the MPU 11 judges at steps 504 and 506 whether or not the rising edge position is normal. When the rising edge position is normal, this results in that TD3OK="1", whereas, when the rising edge position is abnormal, this results in that TD3OK="0". When the MPU 11 judges at a step 512 whether or not the flag TD3OK and pulse width are both normal. If the both are abnormal, then the MPU 11 goes to a step 518 to perform initializing operation and to retry the signal analyzing operation of FIG. 19 from the beginning. When determining at the step 512 that the both are normal, the MPU 11 proceeds to a step 513 to store the judged data and then to a step 514 to clear the timer TM1 and to start the timer TM2. The timer TM1 is cleared at this time point, since the timer TM1 is started at the step 419 in FIG. 22 and prescribes the sustained preamble time and a time until the key code recognition is started. The timer TM2 is started only once when the key code analyzing operation starts, and prescribes the limit time from the start of the key code analyzing operation to the completion of extraction of the key code. This timer also counts up through a fixed-time interrupt operation different from the fixed-time interrupt operation as in the aforementioned timers, detects an abnormality when the key code detection becomes too long or when the signal is interrupted in order to immediately get ready for reentry of the execution from the beginning. When the time-limited timers are built in at various locations as in the present invention, even generation of an abnormality enables the invention can perform signal analyzing operation without waste or idle time.

At a step 515, the MPU 11 judges the completion or non-completion of input of all the data. When determining the completion of the full data input, the MPU 11 goes to a step 516 to perform data collation. That is, the MPU 11 judges on a multiple successive collation basis whether or not the data parts inputted a plurality of times are the same. When this judgement result is OK, the MPU 11 proceeds to a step 518; whereas, when the result is NO, the MPU 11 goes to the step 519 to initialize the operation and to reentry the operation from the beginning.

Figure 26:
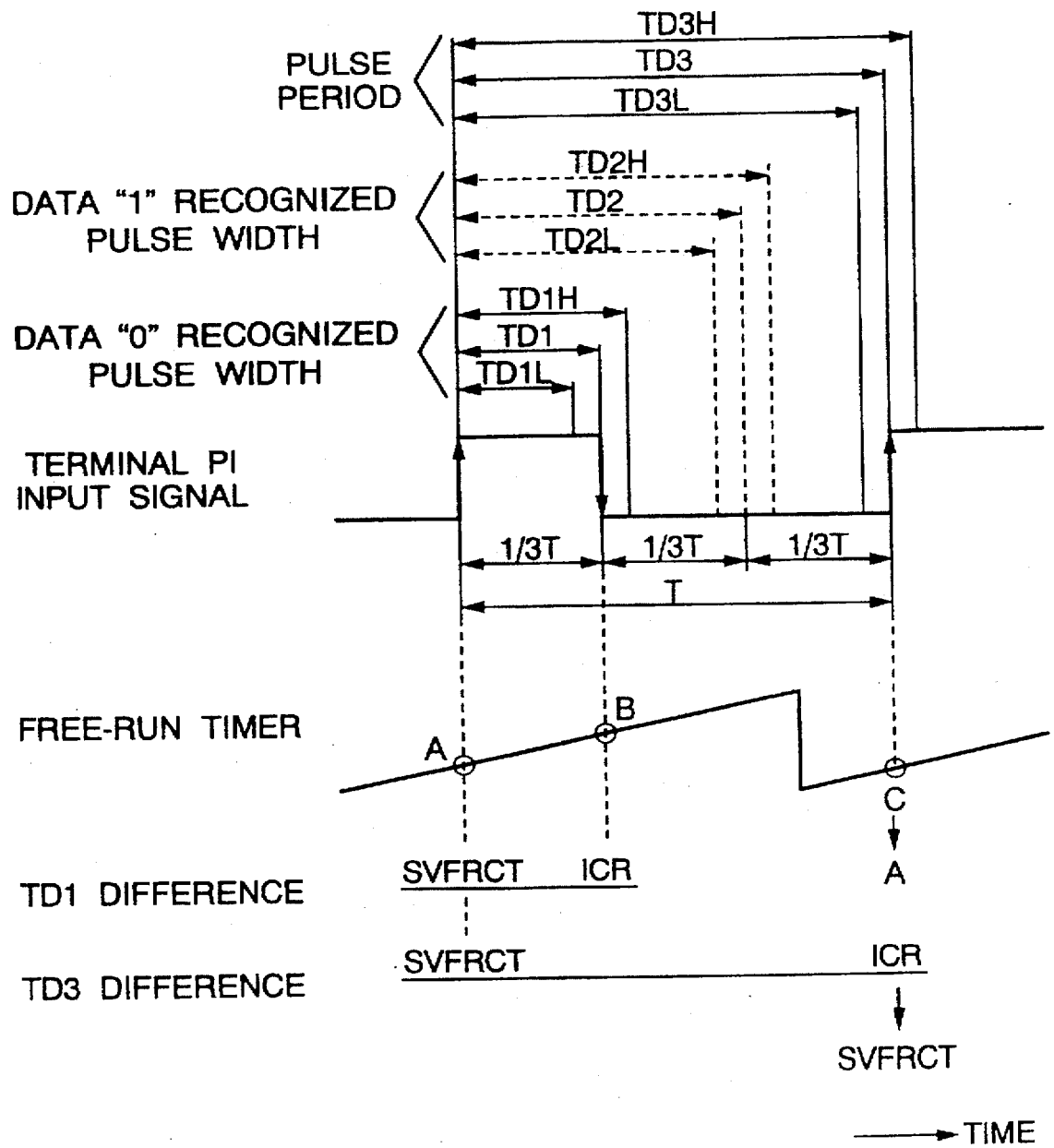
FIG. 26 shows waveforms of converted high and low signals.

Shown in FIG. 26 is a relationship among data "0" and "1", data values on pulse periods, and tolerance ranges thereof with respect to the input signal applied to the terminal PI. In the drawing, the signals are illustrated by solid lines when the data "0" is input, while, the signals are illustrated by broken lines when the data "1" is input. FIG. 26 basically has the same contents as FIG. 24.

As has been explained in the foregoing, in accordance with the present invention, since a signal can be separated from noise while preventing the receiver sensitivity from being decreased, there can be provided a remote-controlled system which can exhibit its performance ability fully even in severe noise environment.

What is claimed is:

1. A car electronic control system comprising:
   a microcomputer having a function of switching between a sleep mode in which oscillation is stopped and an operational mode to be shifted from the sleep mode to the operational mode by at least one external input signal;
   at least one first power supply circuit for supplying power continuously; and
   at least one second power supply circuit for enabling to stop power supply on the basis of a signal received from the microcomputer,
   wherein said second power supply circuit is stopped when the microcomputer shifts to the sleep mode, the microcomputer is shifted to the operational mode when the input signal varies in the sleep mode to judge whether the input signal is normal or abnormal prior to starting usual operation, the microcomputer outputs a signal for starting the power supply of said second power supply circuit to start the usual operation when judging that the input signal is normal while the microcomputer stops the power supply of the second power supply circuit and shifts to the sleep mode when judging that the input signal is abnormal.

2. A car electronic control system as set forth in claim 1, wherein said at least one input signal for causing the microcomputer to be shifted from the sleep mode to the operational mode includes a radio signal in the form of electromagnetic wave or infrared ray.

3. An electronic control apparatus controlled by a radio apparatus, comprising a microcomputer for executing a communication control program for a data communication between said electronic control apparatus and an external control device via a communication line, and a receiver for receiving a radio signal and transmitting the received signal to said microcomputer, wherein said microcomputer is configured to receive, during a signal awaiting sleep mode awaiting, a signal from said receiver, to then cancel the sleep mode, and to execute a program to decide whether said received signal is a desired signal from the radio apparatus or a noise, said microcomputer being further configured to decide that, when said received signal is a noise, the microcomputer returns to the sleep mode, and that, when said received signal is the desired signal, the microcomputer executes said communication control program, and transmits a wake-up request signal to said external control device via said communication line.

* * * * *